(12) United States Patent
Jung

(10) Patent No.: US 10,223,090 B2
(45) Date of Patent: Mar. 5, 2019

(54) BRANCH LOOK-AHEAD SYSTEM APPARATUS AND METHOD FOR BRANCH LOOK-AHEAD MICROPROCESSORS

(71) Applicant: Yong-Kyu Jung, Erie, PA (US)

(72) Inventor: Yong-Kyu Jung, Erie, PA (US)

(73) Assignee: Yong-Kyu Jung, Erie, PA (US)

( * ) Notice: Subject to any disclaimer, the term of this patent is extended or adjusted under 35 U.S.C. 154(b) by 602 days.

(21) Appl. No.: 14/922,112

(22) Filed: Oct. 23, 2015

(65) Prior Publication Data
US 2017/0115988 A1    Apr. 27, 2017

(51) Int. Cl.
G06F 8/41      (2018.01)
G06F 9/38      (2018.01)
G06F 12/0875   (2016.01)
G06F 12/0862   (2016.01)
G06F 12/0897   (2016.01)

(52) U.S. Cl.
CPC ............ G06F 8/4441 (2013.01); G06F 9/382 (2013.01); G06F 9/3804 (2013.01); G06F 12/0862 (2013.01); G06F 12/0875 (2013.01); G06F 12/0897 (2013.01); G06F 2212/1016 (2013.01); G06F 2212/1028 (2013.01); G06F 2212/452 (2013.01)

(58) Field of Classification Search
CPC .... G06F 8/4441; G06F 8/4442; G06F 9/3802; G06F 9/3804; G06F 12/0862
See application file for complete search history.

(56) References Cited

U.S. PATENT DOCUMENTS 5,742,804 A * 4/1998 Yeh ................ G06F 9/3804
                                          712/207
7,441,110 B1* 10/2008 Puzak ............. G06F 8/4442
                                          712/207

OTHER PUBLICATIONS

Jim Pierce and Trevor Mudge, "Wrong Path Instruction Prefetching", 1996, IEEE. (Year: 1996).*

* cited by examiner

Primary Examiner — Benjamin P Geib

(57) ABSTRACT

A method and system of the look-ahead branch prediction and instruction fetch are designed for hiding multi-cycle taken-branch prediction latency while providing accurate and timely instruction fetch and performing look-ahead branch prediction. The invention is designed for identifying the branches that require to be predicted and for reordering the branches in program to perform the look-ahead branch prediction operations during the invented compilation. The invention is also designed for delivering the branch look-ahead instructions comprising predictable branch instructions and the other instructions. In particular, the reordered branch look-ahead instructions are sequentially or concurrently fetched to a single or plurality of branch look-ahead microprocessors in an accurate and timely manner while dynamically recovering order of the branch look-ahead instructions to achieve compatibility of the original program.

20 Claims, 3 Drawing Sheets

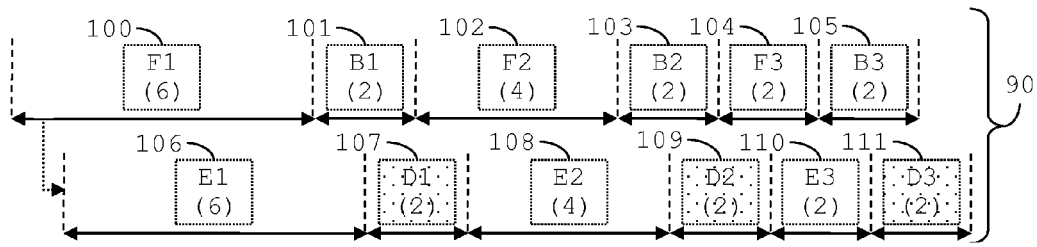

90: A DOUBLE-OVERLAPPING BRANCH PREDICTION SCHEME IN PRIOR ARTS FOR A DUAL-FETCHER, DUAL-DECODER, & DUAL-ISSUER ON IN-ORDER SUPERSCALAR PROCESSOR

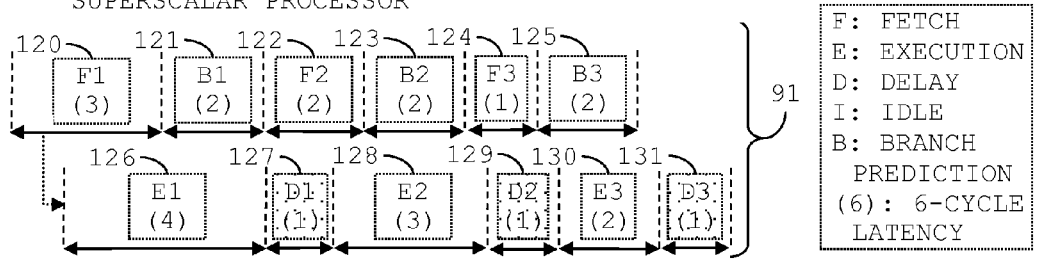

F: FETCH
E: EXECUTION
D: DELAY
I: IDLE
B: BRANCH PREDICTION
(6): 6-CYCLE LATENCY

91: A DOUBLE-OVERLAPPING BRANCH PREDICTION SCHEME IN PRIOR ARTS FOR A QUAD-FETCHER, TRIPLE-DECODER, & TRIPLE-ISSUER ON OUT-OF-ORDER SUPERSCALAR PROCESSOR

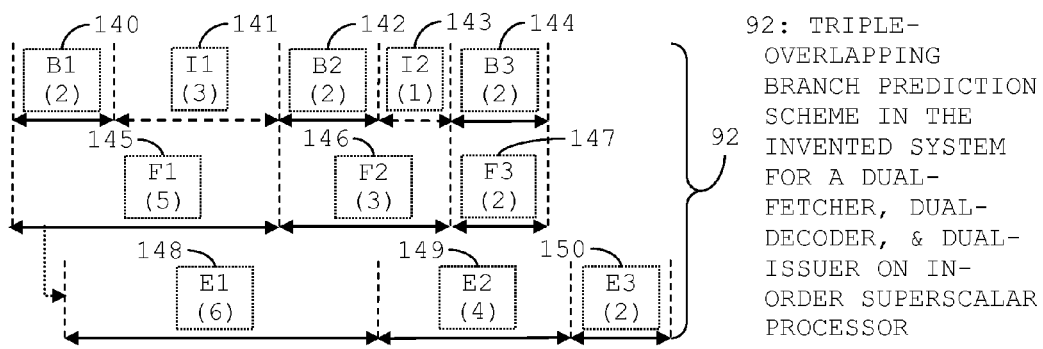

92: TRIPLE-OVERLAPPING BRANCH PREDICTION SCHEME IN THE INVENTED SYSTEM FOR A DUAL-FETCHER, DUAL-DECODER, & DUAL-ISSUER ON IN-ORDER SUPERSCALAR PROCESSOR

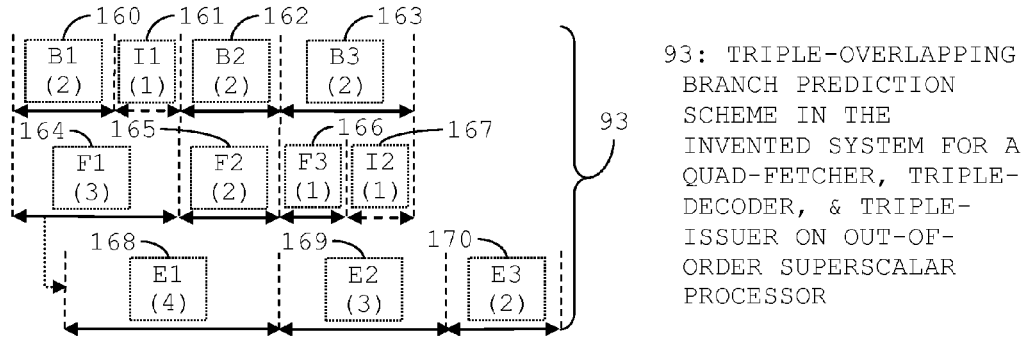

93: TRIPLE-OVERLAPPING BRANCH PREDICTION SCHEME IN THE INVENTED SYSTEM FOR A QUAD-FETCHER, TRIPLE-DECODER, & TRIPLE-ISSUER ON OUT-OF-ORDER SUPERSCALAR PROCESSOR

FIG. 3

BRANCH LOOK-AHEAD SYSTEM APPARATUS AND METHOD FOR BRANCH LOOK-AHEAD MICROPROCESSORS

TECHNICAL FILED OF THE DISCLOSURE

The invention relates to creating a single or plurality of branch look-ahead instruction streams (BLI-streams) from a single or plurality of instruction streams (i-streams) used in program compiled for a microprocessor, where the i-stream is a sequence of instructions from an instruction at the target of a taken branch to the next prediction-required taken-branch instruction of the compiled program. The BLI-streams comprise reordered prediction-required branch instructions (PBIs) and other instructions, such as non-prediction-required branch instructions (NPBIs) and/or non-branch instructions (NBIs). A sequence of instructions does not include any PBI is a non-BLI stream.

The PBIs are branch instructions that require to be predicted by a branch predictor. The NPBIs are also branch instructions that do not require to be predicted by the branch predictor. The NBIs are the instructions that are not branch instructions used in the compiled program.

A PBI is only relocated from the last location of an i-stream to the first location of the same i-stream. Then, this reordered i-stream becomes a BLI-stream, which is a sequence of reorder instructions from a PBI to the remaining instructions in the same order. More specifically, a BLI-stream is a sequence of instructions from the next branch instruction required prediction followed by an instruction at the target of a taken-branch predicted from the previous BLI-stream to the second last instruction located in the i-stream.

The BLI-streams are for predicting branch instructions early and fetching other instructions quickly while the BLI-streams are for executing in the same or compatible order in the branch look-ahead (BL) microprocessor, where the BL microprocessor is a microprocessor fetches and predicts branch instructions before fetching the other instructions in the same i-streams, but executes entire instructions in the same or compatible order compiled. The fetched BLI-streams are dynamically reordered by relocating the PBIs placed in the first locations of the associated BLI-streams fetched to the last locations of the BLI-streams for decoding and executing the instructions by the BL microprocessor.

The invention relates to the decomposition of the program in prior arts to the look-ahead branch prediction instructions as PBIs and compatible form and order of native instructions, as NPBIs and NBIs. In particular, PBIs of the BLI-streams are fetched to a branch predictor for predicting taken or non-taken branches and for determining branch target locations if the predicted branches are taken.

The invention relates to prefetching and fetching a single or plurality of instructions of the BLI-streams in sequential or parallel from a single or plurality of main BLI memories via a single or plurality of levels of BLI caches to the single or plurality of the BL microprocessors in an accurate and/or timely manner.

The invention relates to prefetching BLI-streams from both of taken-branch path and fall-though path and continue to prefetching a single or plurality of times more, where the taken-branch path is a location of next BLI- or non-BLI stream if the current PBI takes a branch and the fall-through path is a location of next BLI- or non-BLI-stream if the current PBI does not take a branch.

BACKGROUND OF THE DISCLOSURE

The present invention relates generally to decompose PBIs from i-streams in the compiled program and to convert the i-streams to BLI- or non-BLI-streams before prefetching and fetching BLI- or non-BLI-streams for look-ahead branch prediction with PBIs in a sequential and/or parallel manner. More specifically, it relates to hide latency of branch prediction and to increase instruction fetch bandwidth, which is a number of instructions fetched per the BL microprocessor clock cycle. The invention also relates to identify the PBIs, NPBIs, and NBIs. More specifically, a PBI represents a BLI-stream comprising the PBI at the beginning and a single or plurality of NPBIs and/or NBIs after. The PBI contains information to predict branch operation, obtaining branch target location of the PBI, and others if necessary.

The invented branch look-ahead (BL) system includes a branch look-ahead compilation (BLC) software system to decompose i-streams, which generally contain pairs of prediction-required branches and branch target instructions and vice versa. In addition, the BLC software system creates a PBI to represent a BLI-stream as a single prediction-required branch instruction for predicting next path if necessary. In particular, the BLI-stream comprises the branch instructions with non-branch instructions in a loop or a subroutine. The BLC software system relocates any PBI at the end of the i-stream to the first location of the BLI-stream for fetching the PBI before or currently fetching any other instructions from the BLI-stream. Therefore, a PBI is fetched for predicting taken- or not-taken branch operation and for obtaining branch target address to take a branch.

The invented BLC software system generates BLI-streams comprising PBIs and associated NPBIs and/or NBIs from the compiled program, such as the assembly program. The BLI-streams are sequentially and/or concurrently prefetched and/or fetched through separate paths of the branch look-ahead instruction memory (BLIM) systems if necessary. A PBI initiates to access a single or plurality of NPBIs and/or NBIs in general. Thus, the NPBIs and/or NBIs are only prefetched or fetched after prefetching or fetching the PBI. This results in look-ahead branch prediction and the sequential and/or concurrent instruction prefetching and fetching while hiding taken-branch latency.

The BLC software system composes a PBI comprising an associated opcode to identify it as a prediction-required branch, such as conditional branch, and other information including the last instruction of the associated BLI-stream, the information of the branch target location, and/or other information, for prefetching and fetching the next BLI- or non-BLI-streams.

The BL system apparatus and method is designed for enhancing bandwidth of fetching the BLI- or non-BLI-streams, hiding latencies of the BLI cache access, hiding branch prediction latencies, and improving the overall performance of the BL microprocessors. The invented BL system uses a branch look-ahead instruction prefetching (BLIP) system and fetching (BLIF) system integrated to a single or plurality of concurrently accessible hierarchical BLIM systems.

The invented BLIP/BLIF systems prefetch and/or fetch a single or plurality of instructions in BLI- or non-BLI-streams concurrently for branch prediction and/or instruction decode to the BL microprocessors while delivering a single or plurality of BLI- or non-BLI-streams in their compatible fetching order for instruction decode and execution to the BL microprocessors after predicting each PBI. The BLIP/BLIF systems prefetch and fetch instructions in BLI- or non-BLI-streams from the single or plurality of concurrently accessible main BLI memories via a single or plurality of levels of concurrently accessible BLI caches and delivering the instructions of BLI- or non-BLI-streams to the BL microprocessors.

The invented BLIP/BLIF systems are capable of branch look-ahead prefetching the single or plurality of instructions of BLI- or non-BLI-streams from the locations of the main BLI memories via the single or plurality of levels of BLI caches by obtaining a single or plurality of addresses from the instructions of the BLI- or non-BLI-streams to a single or plurality of locations in the main BLI memories and/or BLI caches. The BLIP system prefetches the next prospective BLI- or non-BLI-streams from both of taken- and not-taken branch paths and continuously prefetches instructions of the BLI- or non-BLI-streams from a single or plurality of next paths while the BLIF system fetches the instructions of the BLI- or non-BLI-streams to the BL microprocessors.

The BL system apparatus and method for the BL microprocessors permits hiding a number of taken-branch prediction latencies while providing the compatible instruction prefetching and fetching. In addition, the BL system apparatus and method for the BL microprocessors allows fragmenting an i-stream to a single or plurality of the fragmented instructions to prefetch and fetch multiple instructions in the same i-stream in parallel and quickly while continuously providing the code compatibility. Alternatively, the BLC software system directly produces the BLI- or non-BLI-streams from high-level language programming.

The BL system apparatus and method effectively utilizes available instruction caches in terms of the cache size, power consumption, and operational speed. The invention also prefetches in a look-ahead manner the PBIs, NPBIs, and NBIs on both of the prospective paths in the program flow concurrently or sequentially before fetching and branch predicting PBIs and fetching NPBIs and NBIs concurrently or sequentially. Furthermore, the invention fetches PBIs, NPBIs, and NBIs in an accurate manner by fetching PBIs, NPBIs, and NBIs from the BLI caches. Since the PBIs do not change any operation results, the NPBIs and NBIs provide compatibility if the NPBIs and NBIs are fetched and executed in the same or compatible order. Therefore, changing order of PBIs in program from the last locations of the i-streams to the first locations still maintain important information regarding the order of the NPBIs and NBIs. However, the PBIs are fetched to a branch predictor for predicting a single or plurality of cycles in advance to fetch next i-stream.

Through this invention, one can decompose their own compatible and ciphered instructions as PBIs, NPBIs, and NBIs and prefetch and fetch them sequentially and/or concurrently from the main BLI memories via the levels of the BLI caches. More specifically, a single or plurality of branch prediction results is obtained by look-ahead prefetching and/or fetching of next PBIs and the associated NPBIs and NBIs to a single or plurality of the BL microprocessors, which predicts branches in advance and decodes and executes in compatible order dynamically.

Problems of the Art

Accessible instruction level parallelism, branch prediction accuracy, and instruction fetch (i-fetch) bandwidth are important parameters that affect the performance of superscalar processors. Since the i-fetch bandwidth is closely related to branch prediction latency and instruction cache (i-cache) miss latency, various i-fetch, i-prefetch, i-cache, and branch prediction schemes have been developed for improving i-fetch bandwidth of both high-performance out-of-order superscalar processors and energy-efficient in-order superscalar processors.

U.S. Pat. No. 7,181,597 [1] provides enhanced performance by employing a trace cache. In particular, this approach decodes the first instruction into a single or plurality of operations with a decoder. The decoder passes the first copy of the operations to a build engine associated with a trace cache. In addition, the decoder directly passes the second copy of the operation to a back end allocation module in a decoder. This approach enhances performance by selectively bypassing a trace cache build engine.

A trace cache [2] is presented that contains decoding information of the instructions consecutively executed before. To achieve higher throughput from superscalar processors, fetching multiple basic blocks per cycle becomes necessary. The trace cache supplements instruction cache by dynamically tracing the i-stream and contiguously locating the instructions. The trace cache directly passes the decoding information when the same i-stream is decoded. Consequently, performance enhancement and high bandwidth instruction fetching can be achieved with the trace cache. However, this approach heavily relies on the capability of employing branch prediction hardware for performance improvement. The trace cache approach must obtain decoding results after dynamically decoding the same instructions. The trace cache approach cannot hold all of the traces of the multiple blocks without increasing the trace cache size. Furthermore, this approach must decode again and keep the trace of the decoded results of the instruction block if the trace of the same block is changed.

U.S. Pat. No. 6,167,536 [3] presents an on-chip instruction trace cache capable of providing information for reconstructing instruction execution flow. In particular, U.S. Pat. No. 6,167,536 [3] presents the instructions that disrupt the instruction flow by branches, subroutines, and data dependencies. Therefore, this approach allows less expensive external capture hardware to be utilized and also alleviates various bandwidth and clock synchronization issues confronting many existing solutions.

U.S. Pat. No. 6,047,368 [4] claims that an instruction packing apparatus employs a compatibility circuit including translation and grouper circuits where the translation and grouper circuits, respectively, transform old instructions to new instructions as simpler forms and group instructions based on instruction type by hardware when transferring a cache line from the memory to cache. Although the dynamical packing and identifying of assigned functionalities of the assembled instructions issue and execute concurrently, this approach focuses only on increasing instruction level parallelism while paying additional hardware cost. U.S. Pat. No. 6,047,368 [4] still requires at least the same or more instruction cache.

U.S. Pat. No. 5,509,130 [5] describes packing and issuing instructions simultaneously per clock cycle for execution. An instruction queue stores sequential instructions of a program and branch target instruction(s) of the program, both of which are fetched from the instruction cache. The instruction control unit decodes the sequential instructions, detects operands cascading from instruction to instruction, and groups instructions according to a number of exclusion rules which reflect the resource characteristics and the processor structure. This approach, however, groups instructions after fetching sequential instructions from the instruction cache. Therefore, it still requires involving branch prediction and resolution units for branch instructions because of packing at runtime.

U.S. Pat. No. 7,269,715 [6] presents an improved method and apparatus for packing instructions processed in the same sized instruction sets. This approach distinguishes a current set of instructions received as part of a group including a prior set of instructions using a history data structure. The assembled or reformatted nonnative instructions with a packing indication are issued to the execution units. This approach requires additional hardware, such as grouper circuit and translation circuit.

U.S. Pat. No. 8,527,969 [7] presents systems and methods for dynamic binary translation in an interpreter. U.S. Pat. No. 8,245,208 [8] presents to generate loop code to execute on single-instruction multiple-datapath architecture. U.S. Pat. No. 5,999,739 [9] presents a procedure to eliminate redundant conditional branch statements from a program.

The invention deals with both fragmented and non-fragmented BLI- or non-BLI-streams that include loops and/or subroutines with branch instructions and decomposes them to a single PBI and the associated NPBIs and/or NBIs. Branch prediction, therefore, is necessary for those branch instructions already decomposed to a PBI, but executes compatible branch operations of the entire loop/subroutine decomposed after fetching the instructions of BLI- or non-BLI-streams.

Since a PBI initiates to access the number of consecutive NPBIs and/or NBIs during the instruction prefetch/fetch operations, the BL microprocessor continues to execute the instructions in compatible program order while a fetched PBI is used for predicting branch and forwarding a branch target address for prefetching/fetching the next BLI- or non-BLI-stream by updating the associated stream program counter (SPC) installed in the BLIP and/or BLIF systems. The invention also employs a single or plurality of intra-stream program counters (intra-SPC) for prefetching and/or fetching NPBIs and/or NBIs in each BLI- or non-BLI-stream.

The invention also prefetches and/or fetches PLIs fewer cycles in advance than the microprocessors in prior arts do. It is true that an amount of i-streams in program are less than equal to an amount of instructions in the program. A BL microprocessor along with the BLIF system fetches PBIs earlier to hide branch prediction latency and NPBIs and/or NBIs in each BLI- or non-BLI-stream earlier to eliminate BLI-cache miss latency than the microprocessor in prior arts without employing the BLIF system. Thus, the invention permits that instruction fetches and branch predictions can be started a plurality of times earlier than the same fetch and branch prediction operations executed by the microprocessor without employing the BLIF system.

Unlike data prefetching, instruction prefetching is complicated and implemented as hardware [10, 11]. Since instruction prefetching accuracy is an important factor to mitigate i-cache pollution, often instruction prefetchers employ branch predictors to achieve further alleviation of instruction fetch bandwidth [12, 13]. Existing look-ahead prefetching, however, is still limited by branch prediction bandwidth [14]. Therefore, the invented BLIP system does not include any branch predictors for prefetching. Instead, the BLIP system is built as a modified two- or three-consecutive wrong path prefetcher with simple PBI decoder. In order to provide a look-ahead prefetching capability, the branch targets are obtained by decoding PBIs. A fewer number of PBIs are prefetched first and then the associated NPBIs and/or NBIs are prefetched in parallel from the concurrently accessible memory and caches in order to mitigate disadvantages of the wrong path approach [15], such as increasing memory/cache traffic and pollution.

In addition, the invention allows all NPBIs and/or NBIs of the BLI- or non-BLI-streams to concurrently fetch if necessary. The invention temporarily holds its next fetch operation until the PBI is predicted. This prevents unwanted NPBIs and/or NBIs from being fetched to the BL microprocessor.

Since each BLI-stream representing a loop or a subroutine comprises one or more than one NPBI or one NBI instruction, the single or plurality of NPBIs and NBIs is prefetched in a sequential or concurrent manner. Therefore, prefetching early an ample number of NPBIs and/or NBIs with a single PBI concurrently and fetching the prefetched instructions can compensate multi-cycle instruction cache or even longer main memory access time.

In addition, the number of instructions decomposed into each BLI- or non-BLI-stream is fragmented in order to balance the instruction cache usage by allocating the instructions of the consecutively located BLI- or non-BLI-streams to the dedicated, separate regions in instruction caches and/or main memories, such as cache/memory banks, dual or multiple ports memories, and so forth. Consequently, the instruction cache usage in the invention reduces unused or frequently replaced cache lines according to the associated cache replacement policy.

SUMMARY OF THE DISCLOSURE

The invention generally relates to a microprocessor system comprising a software compiler as a branch look-ahead compilation (BLC) software system and a branch look-ahead (BL) hardware system comprising a branch look-ahead instruction memory (BLIM) system, a branch look-ahead memory management unit (BLMMU), and a branch look-ahead (BL) microprocessor comprising a stream fetch unit, a PBI decode unit, a branch predictor, an end of BLI-stream identifier, an instruction reorder unit, and other units typically found in prior arts.

The BLC software system generates a branch look-ahead friendly form of code from pre-compiled software code while maintaining code compatibility. The BLC software system also generates three different classes of instructions for identifying prediction-required branch instructions (PBIs), non-prediction-required branch instructions (NPBIs), and non-branch instructions (NBIs) for decomposing each BLI-stream starting with a PBI for look-ahead branch prediction.

A PBI is representing a BLI-stream, which also contains a single or plurality of NPBIs and/or NBIs. The BLC software system generates segments of the instructions in the assembly code compiled by a software compiler in prior arts as BLI- or non-BLI-streams. The BLC software system also generates the BLI- or non-BLI-streams packed in a BLI- or non-BLI-stream comprising the BLI- or non-BLI-streams in compatible order. The BLI- or non-BLI-streams provide a means to access the instructions encapsulated and another BLI- or non-BLI-stream at the target of the taken-branch PBI in the BLI-stream.

A number of instructions in a packable instruction segment are fragmental for fitting into the organizations of the single of plurality of BLI memories as main instruction memories, and the single of plurality of levels of BLI caches as instruction caches implemented in the BLIM system. The BLC software system generates a single loop BLI-stream from a loop.

The invented BLIM system comprises a single or plurality of main instruction memories, such as main BLI memory, and a single or plurality of levels of instruction caches, such as L1 and/or L2 BLI caches.

Both BLI- or non-BLI-streams are prefetched and fetched to the BL microprocessor from the BLIM system via the BLMMU. The BLI caches are designed for accessing a single or plurality of PBIs, NPBIs, and/or NBIs in the BLI- or non-BLI-streams in each BL microprocessor clock cycle. The invented BLMMU also comprises a single or plurality of BLIP systems and BLIF systems.

Instruction prefetchers in prior arts do or do not include any branch predictors for prefetching. Instead, the BLIP system in the BLMMU was built as a modified two-/three-consecutive wrong path prefetcher with the simple PBI/NPBI decoder in order to provide a look-ahead prefetching capability by decoding PBIs/NPBIs and obtaining the branch targets. The modified two-/three-consecutive wrong path prefetcher with the simple PBI/NPBI decoder prefetches BLI- or non-BLI-streams from both of taken-branch path and fall-though path after prefetching a PBI and continue to prefetch a single or plurality of times more, where the taken-branch path is a location of next BLI- or non-BLI-stream if current PBI takes a branch and the fall-through path is a location of next BLI- or non-BLI-stream if the current PBI does not take a branch.

The modified two-/three-consecutive wrong path prefetcher with the simple PBI/NPBI decoder also prefetches BLI- or non-BLI-streams from taken-branch paths after prefetching a NPBI and continue to prefetch a single or plurality of times more, where the taken-branch path is a location of next BLI- or non-BLI-stream after current NPBI takes a branch.

The BLIP system also prefetches a fewer number of PBIs from BLI-streams first and then the associated NPBIs and/or NBIs of the prefetched BLI-streams in parallel from the concurrently accessible BLI memories and/or L2 BLI caches to the concurrently accessible L1 BLI caches.

In addition, a plurality of the first instructions in the BLI- or non-BLI-streams, such as PBIs in the BLI-streams or NPBIs and/or NBIs in the non-BLI-streams, can be prefetched by the BLIP system and/or fetched by the BLIF system sequentially, while other instructions in the BLI- or non-BLI-streams are prefetched by the BLIP system and/or fetched by the BLIF system in a pipelined parallel manner. The look-ahead prefetching contributes to alleviate effects of cache traffic and pollution. Similar to fetching from each line of cache in prior arts, instructions in a BLI- or non-BLI-stream are separately transformed to a plurality of BLI- or non-BLI-streams by the same size of the cache line by the BLC software system.

The BLIF system is for delivering branch look-ahead and compatible order of the instructions to the BL microprocessor in a timely and accurate manner. The BLIF system fetches the BLI- and non-BLI-streams fragmented via the BLI caches in the pipelined parallel manner. Therefore, the BLIF system delivers the PBIs of the BLI-streams to a branch predictor in the BL microprocessor in earlier cycles than instruction fetch mechanisms in prior arts can do. The BLIF system accurately fetches only instructions from the predicted or fall-through path and resumes next instruction fetching early.

There has thus been outlined, rather broadly, some of the features of the invention in order that the detailed description thereof may be better understood, and that the present contribution to the art may be better appreciated. Additional features of the invention will be described hereinafter.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide the BL system apparatus and method that improves the performance and energy efficiency of the BL microprocessor system, including the achievement of look-ahead branch predicting and accurate and/or look-ahead concurrent prefetching and/or fetching of BLI- and non-BLI-streams, for enhanced microprocessor throughput while maintaining compatibility of the software.

An object is to provide the BLC software system that decomposes the instructions in the software and/or assembly program into BLI- and non-BLI-streams. Alternatively, the BLI- and non-BLI-streams can also be generated by a single compilation that includes the same instruction assembling capability as the invented system. The PBIs are composed by assigning different opcodes and other information to the PBIs if needed.

Another object is to provide the BLC software system that identifies PBIs and transforms i-streams to BLI- and/or non-BLI-streams. More specifically, a BLI-stream is composed by relocating a PBI from the last location of the qualified i-stream, shifting the other instructions after the PBI, and including an identification mark to the last instruction of the BLI-stream. An i-stream is transformed to a non-BLI-stream if the i-stream does not include a PBI.

Another object is to provide the BLC software system that eliminates and/or hides non-prediction-required branch instructions, including unconditional jumps, from the program for dynamically extending length of BLI- and non-BLI-streams and composes compatible and customized forms of the BLI- and non-BLI-streams for preventing malicious and illegal copying of various software programs while delivering compatible segments of the instructions to the BL microprocessor.

An object is to provide the BL system that decodes the PBIs for concurrently prefetching and fetching the associated NPBIs and/or NBIs stored in dedicated, separate regions of distinct addresses in a single or plurality of the BLI memories and/or the BLI caches.

Another object is to provide the BL system that obtains an access point of the associated NPBIs and/or NBIs from the PBIs and prefetches and/or fetches the associated NPBIs and/or NBIs during the BLI-stream prefetching and/or fetching operations.

Another object is to provide the BL system that prefetches a single or plurality of BLI- and non-BLI-streams from the next prospective locations, such as the next BLI- or non-BLI-stream at the branch target location and the next BLI- or non-BLI-stream at the fall-through path, whenever prefetching a PBI.

Another object is to provide the BL system apparatus and method that provides a way to satisfy the BLI cache usage and reducing branch prediction and cache access latencies through the invented look-ahead, accurate, pipelined, and parallel prefetching and fetching, unlike memory systems employed in microprocessors in prior arts. Another object is to provide the BL system apparatus and method that utilizes BLI- or non-BLI-streams, which encapsulate only undisrupted instruction segments, in the program to accurately prefetch the single or plurality of PBIs, NPBIs, and/or NBIs that will be prefetched, fetched and executed by the BL microprocessor, unlike prefetching and fetching a certain number of the instructions that include many of the unused instructions for execution of the microprocessor in prior arts.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called, however, to the fact that the drawings are illustrative only, and that changes may be made in the specific construction illustrated and described within the scope of this application.

BRIEF DESCRIPTION OF THE DRAWINGS

A more complete understanding of embodiments of the disclosure will be apparent from the detailed description taken in conjunction with the accompanying drawings in which:

FIG. 3 is a diagram showing one embodiment of instruction prediction, fetch and execution operations of a BL hardware system and a BL microprocessor for look-ahead branch prediction, instruction fetch, and instruction execution in parallel operations.

DETAILED DESCRIPTION OF EXAMPLE EMBODIMENTS

Figure 1:
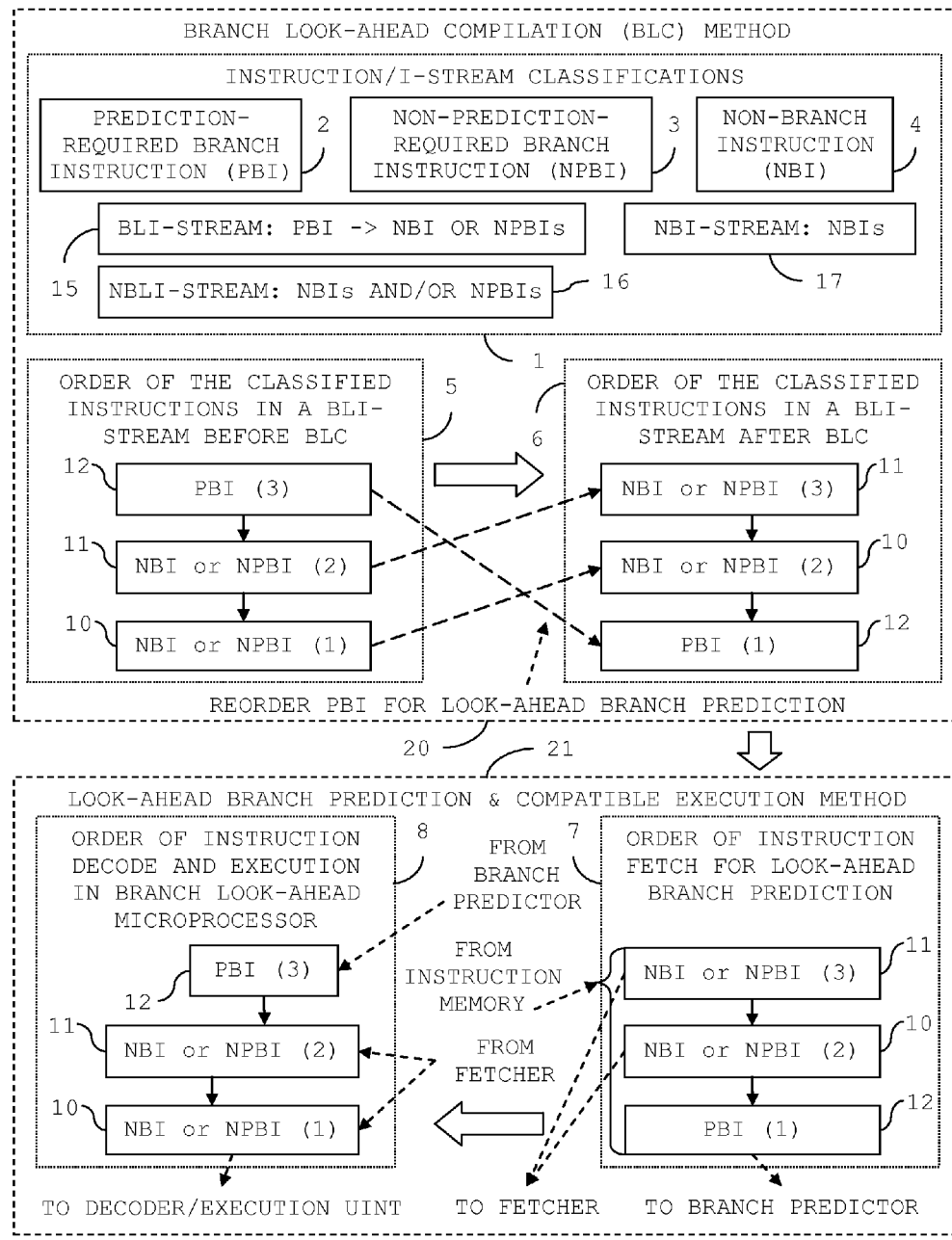
FIG. 1 is a diagram showing one embodiment of the BLC software compilation method for reordering three different classes of instructions, such as PBI, NPBI, and NBI, in an i-stream, and the look-ahead branch prediction and compatible execution method for fetching those reordered instructions to the BL microprocessor via the BL hardware system and for ordering back the instructions in the BL microprocessor before compatibly executing the instructions.

FIG. 1 is a diagram showing one embodiment of a BLC method 20, comprising PBIs 2, NPBIs 3, and NBIs 4 classifications, BLI-stream 15, NBLI-stream 16, and NBI-stream 17 classifications, and generation. The BLC method 20 decomposes PBIs 2, NPBIs 3, and/or NBIs 4 from each i-stream 5 in the compiled program and converts the i-stream 5 to the BLI-stream 15, 6 by reordering the PBI 12 located at the end of the i-stream 5 to the beginning of the BLI-stream 6, shifting the other instructions, including NBI and/or NPBI 10, 11, after the PBI 12, and identifying the last instruction, such as NBI and/or NPBI 11, in the BLI-stream 6 for indicating the end of the BLI-stream 6, or to a non-BLI stream by identifying the i-stream, which does not include any PBI in the i-stream.

FIG. 1 is also a diagram showing one embodiment of a look-ahead branch prediction and compatible execution method 21, including the look-ahead branch prediction of PBI 12 and the prefetch and fetch of NBI and/or NPBI 10, 11, and the compatible execution of NBI and/or NPBI 10, 11 and PBI 12 by dynamically ordering back the PBI 12 to the last of the BLI-stream 8. The PBI 12 and NBI and/or NPBI 10, 11 of the BLI-stream 7 or the non-BLI stream are prefetched and fetched in a sequential and/or parallel manner to the BL microprocessor 70 via a single or plurality of BLI caches 42, 43. The PBI 12 is used for look-ahead branch prediction for determining the next BLI- or non-BLI-stream in an execution order before any other instructions are decoded and executed. Then, the PBI 12 predicted by the branch predictor 75 is decoded and executed after the other instructions, NBI and/or NPBI 10, 11, are decoded and executed by dynamically relocating the PBI 12 after the last instruction, NBI or NPBI 11.

In addition, any instructions in any non-BLI-stream are not changed the order of the instructions. Thus, the instructions in the non-BLI-stream are prefetched, fetched, and decoded/executed as the same order of the instructions compiled before the BLC.

More specifically, the BLC method 20 and the look-ahead branch prediction and compatible execution method 21 reduces taken-branch prediction latency with the BL microprocessor 70. The BLC method 20 also classifies the PBIs 2, NPBIs 3, and NBIs 4 and identifies i-streams from the compiled program. The BLC method 20 generates BLI-streams 6 and non-BLI-streams from the identified i-streams. Thus, a BLI-stream 6 is generated because the i-stream 5 contains the PBI 12. More specifically, a PBI 3 contains information to predicting branch operation, to obtaining branch target location of the next BLI- or non-BLI stream, and to performing related operations as a predictable branch instruction.

In one embodiment, the BLC method 20 creates a BLI-stream 6 comprising a PBI 12 and a single or plurality of NBIs and/or NPBI 10, 11 from an i-stream 5 of program compiled by relocating the last instruction, such as PBI 12, of the i-stream 5 in front of the first instruction, such as NBIs and/or NPBI 10, 11, where the i-stream is a portion of the compiled program with a sequence of instructions from an instruction at the target of a taken branch to the next taken-branch instruction. The BLC method 20 also creates a non-BLI-stream comprising a single or plurality of NBIs and/or NPBI 10, 11 without a PBI 12 from a non-branch i-stream of program compiled, where the non-branch i-stream is a portion of the compiled program with a sequence of instructions excluding any branch related instruction. The instructions in the BLI-stream are for fetching and branch prediction in a look-ahead manner. In particular, the PBI 12 contains initial access information of the first instruction of the BLI- or non-BLI-stream after fetching to the branch predictor 75. All of the instructions in the BLI- or non-BLI-stream are allocated to different locations in a single or plurality of main BLI memories 41.

The BLC method 20 performs instruction packing in order to identifying an i-stream or a non-branch i-stream if a single or plurality of consecutive instructions is successfully evaluated for packing. After transforming an i-stream and a non-branch i-stream, respectively, to the BLI-stream and the non-BLI-stream, all of the instructions in each of the BLI- or non-BLI-stream are fragmented to a plurality of instruction segments for prefetching and/or fetching in parallel, where an instruction segment is a sequence of instructions found in an i-stream or a non-branch i-stream.

More specifically, a loop is transformed to a BLI-stream comprising of a PBI followed by a single or plurality of NBIs where the PBI branches to itself. A two-level loop is transformed to a non-BLI-stream for an i-stream before the inner loop followed by a BLI-stream of the inner loop and a BLI-stream for an i-stream after the inner loop. A plurality of loops can be transformed to a combination of a plurality of non-BLI and BLI-streams.

A subroutine is transformed to a BLI-stream comprising of a PBI followed by a single or plurality of NBIs or NPBIs or a single or plurality of NBIs or NPBIs followed by NPBI. An i-stream includes a subroutine caller is transformed to a non-BLI-stream for a single or plurality of NBIs and/or NPBIs followed by a BLI-stream or a non-BLI-stream representing the subroutine and a non-BLI or BLI-stream for a single or plurality of NBIs and/or NPBIs. The same i-stream includes a subroutine caller is also transformed a non-BLI-stream for a single or plurality of NBIs and/or NPBIs followed by a single instruction BLI-stream, which jumps to a BLI-stream or a non-BLI-stream representing the subroutine, and a non-BLI or BLI-stream for a single or plurality of NBIs and/or NPBIs after the subroutine caller.

A PBI comprising an opcode to identify the PBI as a prediction-required branch, such as conditional branch, the information of the branch target location, and so on, for look-ahead branch prediction and for prefetching and fetching NBIs and/or NPBIs after prefetching and fetching the PBI. In particular, each opcode of a PBI is for identifying the same type of the PBIs, such as a conditional branch equal to zero instruction. Any opcodes used for any PBIs must be different from the opcodes used in the NBIs or NPBIs. A PBI can have an additional field in order to identify how many NBIs and NPBIs are in the BLI-stream. Alternatively, the NBI or NPBI in the last located of the BLI-stream has additional information identifying the NBI or NPBI as the last instruction of the BLI-stream for reordering the PBI before decoding and executing the PBI. In this approach, every last NBI or NPBI in every BLI-stream must have different information from the information of the other NBIs or NPBIs located not in the last location of the BLI-stream. Any branch instruction can be considered as an NPBI if any branch instruction can determine the branch operation and/or target branch location during the BLC operation without assisted by a branch predictor 75. Such NPBIs are continuously prefetched and fetched without any branch predictions.

In one embodiment, the look-ahead branch prediction and compatible execution method 21 prefetches and/or fetches the BLI- and non-BLI-streams from the BLIM system 40 to the BL microprocessor 70 via the BLMMU 50. The method 21 fetches a single or plurality of instructions in a BLI- or a non-BLI-stream to the BL microprocessor 70, predicts the next BLI- or the non-BLI-stream from a PBI 12 fetched from the BLI-stream 7, and decodes and executes NBIs or NBPIs 10, 11 of the BLI-stream 7 before decoding and executing the predicted PBI 12. The instructions of the non-BLI-streams are fetched, decoded, and executed in the same order of the instructions in each non-BLI-stream.

Figure 2:
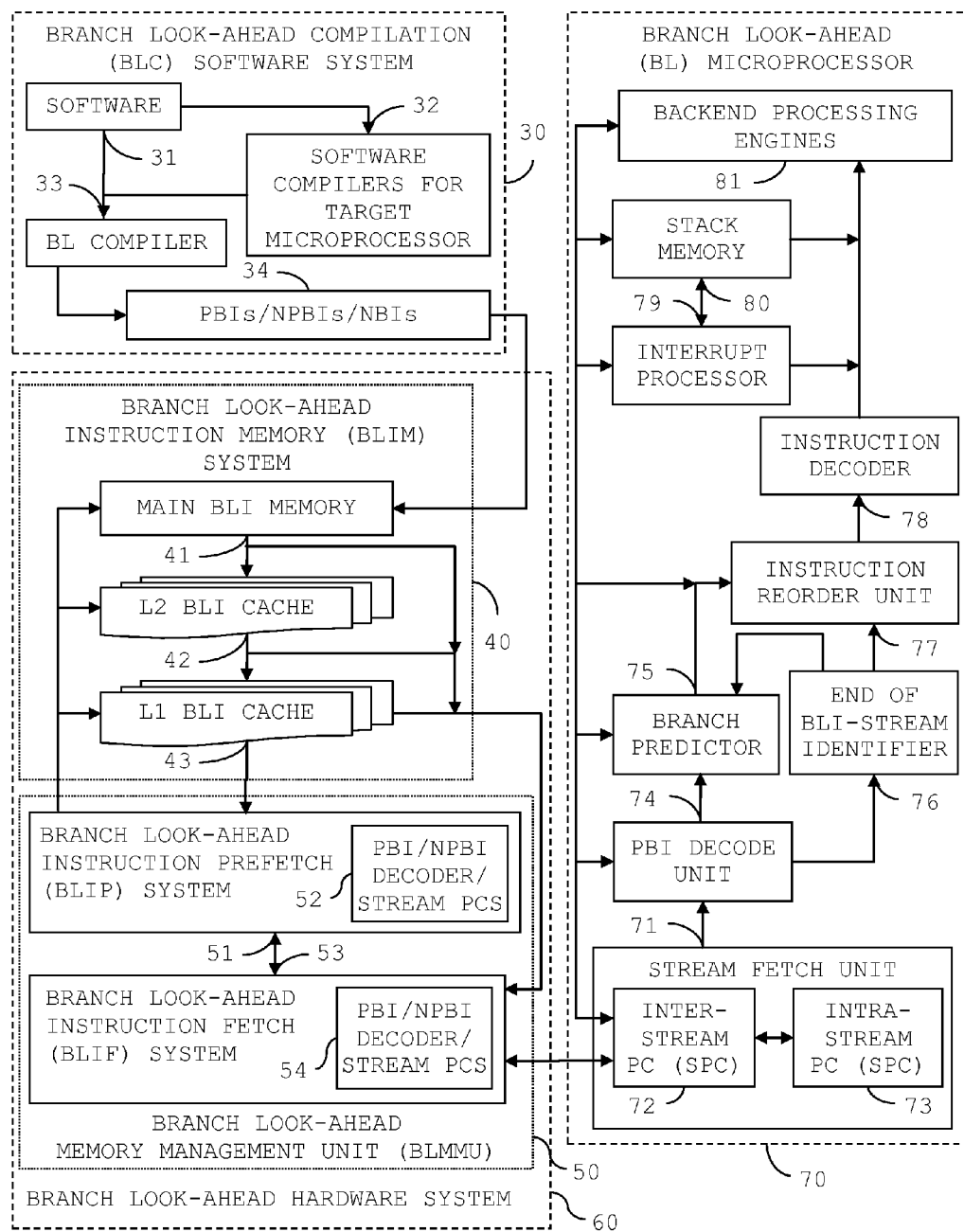
FIG. 2 is a diagram showing one embodiment of a BL system apparatus and method for BL microprocessors comprising a BLC software system, a BL hardware system, which comprises a single or plurality of BLI memories and a single or plurality of levels of BLI caches, a BLMMU, which comprises a BLIP system and a BLIF system, and a BL microprocessor, which comprises a stream fetch unit, a PBI decode unit, a branch predictor, an end of BLI-stream identifier, an instruction reorder unit, and an instruction decoder, as a frontend of the BL microprocessor and an interrupt processor, a stack memory, and a backend processing engines, as a backend of the BL microprocessor.

FIG. 2 shows one embodiment of a BL system apparatus and method for the BL microprocessor comprising a BLC software system 30, a BL hardware system 60, and a BL microprocessor 70.

In one embodiment, the BLC software system 30 comprises various inputs, including software of applications and/or operating systems programmed in high-level programming languages 31 and software compilers for target microprocessors in prior arts 32. The BL compiler 33, as a branch look-ahead code compiler, classifies three different classes of instructions, such as PBIs/NPBIs/NBIs 34, identifies two different types of i-streams for generating BLI-streams and non-BLI-streams, and transforms the i-streams qualified for branch look-ahead operations to the BLI-streams and the other i-streams to non-BLI-streams, such as NBLI-streams and NBI-streams.

In one embodiment, the BL hardware system 60 comprising a BLIM system 40 and a BLMMU 50 are for prefetching and fetching a single or plurality of instructions, including PBIs/NPBIs/NBIs 34 in a single or plurality of BIL- and non-BLI-streams to the BL microprocessor 70.

The BLIM system 40 provides separate paths for sequential and/or concurrent prefetching and/or fetching the PBIs/NPBIs/NBIs 34 in a single or plurality of BLI- or non-BLI-streams if necessary. A BLI-stream accesses a PBI followed by a single or plurality of NPBIs and/or NBIs for sequential fetching. A BLI-stream accesses a plurality of a PBI and other NPBIs and/or NBIs for parallel fetch.

In one embodiment, the BL hardware system 60 enhances bandwidth of fetching both of the BLI- and/or non-BLI-streams by hiding latencies of L2/L1 BLI caches 42, 43 because of look-ahead instruction prefetch and/or fetch. The BL hardware system 60 permits that instruction fetches and branch predictions can be started a plurality of times earlier than the same fetch and branch prediction operations executed by the microprocessor without employing the BL hardware system 60.

A single or plurality of PBIs, NPBIs, and/or NBIs of the BLI- and non-BLI-streams is stored to dedicated, separate regions in the main BLI memory 41. The BLI-streams stored in a single or plurality of main BLI memory 41 are prefetched and fetched in a sequential and/or concurrent manner via a single or plurality of L2 BLI caches 42 and L1 BLI caches 43.

The BLMMU 50 comprising a BLIP system 51 and a BLIF system 53 prefetcher and/or fetches BLI- and/or non-BLI-streams. The BLMMU 50 performs look-ahead branch prediction and prefetch and/or fetch a PBI and a single or plurality of NPBIs and/or NBIs in a current BLI-stream from the next BLI-stream by decoding the PBI of the current BLI-stream. More specifically, the BLIP system 51 in the BL hardware system 60 achieves look-ahead prefetch of a single or plurality of next BLI- and/or non-BLI-streams from both of the fall-though and the branch-target paths by decoding the PBI/NPBI decoder and the stream program counters (PCs) 52 without the branch predictor 75. The BLIF system 53 in the BL hardware system 60 achieves look-ahead fetch of a single or plurality of next BLI- and/or non-BLI-streams from the predicted paths or branch-target paths by decoding the PBI decoder and the stream PC 54 without the branch predictor 75.

In one embodiment, the BLIP system 51 is a modified wrong path prefetcher with a simple PBI/NPBI decoder 52 and an associated stream PCs 52. The BLIP system 51 does not employ any branch predictor for prefetching. The simple PBI/NPBI decoder 52 provides branch target addresses to the modified wrong path prefetcher for a look-ahead prefetching capability by decoding the prefetched PBIs or NPBIs if the branch target addresses are obtainable. Otherwise, the BLIP system 51 terminates the prefetch operation from the unobtainable location of the PBI or NPBI. A new prefetch operation can be resumed by receiving a prefetch request from the BLIF system 53 by updating the stream PCs 52 in the BLIP system 51.

In one embodiment, the BLIF system 53 fetches a single or plurality of instructions in a single or plurality of BLI caches sequentially and/or concurrently to the BL microprocessor 70 for look-ahead fetching of PBIs/NPBIs/NBIs 34 upon receiving the predicted addresses from the branch predictor 75. The BLIF system 53 more accurately fetches all instructions of the BLI- and/or non-BLI-streams by temporarily holding next fetching operation until the next BLI- and/or non-BLI-streams predicted by the branch predictor 75 are determined by the backend processing engines 81. Since the PBI predicted is fetched plurality clock cycles early, branch prediction latency and branch determination latency also can be hidden. Therefore, The BLIF system 52 prevents unwanted instructions from being fetched to the BL microprocessor 70.

The BLIF system 53 fetches a plurality of the fragmented PBIs/NPBIs/NBIs 34 in BLI- and/or non-BLI-streams in a pipelined parallel manner in order to increase instruction fetch bandwidth. The BLIF system 53 fetches PBIs/NPBIs/NBIs 34 from the fetch address in the stream PC 54 whenever the associated BLI- or non-BLI-stream is fetched by the BLIF system 53. Alternatively, the BLIF system 53 begins to fetch PBIs/NPBIs/NBIs 34 pointed by a single or plurality of addresses pointing locations of the first instructions in the BLI- or non-BLI-streams. The other instructions consecutively located in the same BLI- or non-BLI-streams are fetched until the termination information of the last instructions of the BLI- or non-BLI-streams is fetched.

In one embodiment, the BL microprocessor 70 with the BL hardware system 60 prefetches and fetches a PBI and a single or plurality of NPBIs and/or NBIs in a BLI-stream in sequential or parallel from a single or plurality of main BLI memories 41 via a single or plurality of levels of L2 and L1 BLI caches 42, 43 to a single or plurality of the BL microprocessors 70 in a look-ahead and accurate manner. The BL microprocessor 70 with the BL hardware system 60 prevents malicious and illegal copying of software programs. The BL microprocessor 70 with the BL hardware system 60 creates compatible and ciphered instructions as PBIs/NPBIs/NBIs 34 in BLI- and non-BLI-streams and to prefetch and fetch a PBI and a single or plurality of NPBIs and/or NBIs in a BLI-stream or a single or plurality of NPBIs and/or NBIs in a non-BLI-stream sequentially and/or concurrently from the BLI memories 41 via the levels of the BLI caches 42, 43.

The BL microprocessor 70 fetches instructions in a BLI-stream and/or a non-BLI-stream from the BL hardware system 60 to the stream fetch unit 71. The fetched instructions in a BLI-stream and/or a non-BLI-stream are addressed by the inter-stream program counter (inter-SPC) 72 and are forwarded to the PBI decode unit 74, where identifies only PBIs in the BLI-streams for look-ahead branch prediction in the branch predictor 75. NPBIs and NBIs are forwarded to the end of BLI-stream identifier 76 for screening the last instruction of each BLI-stream. A branch predictor 75 predicts next path according to the PBI received and holds the PBI until the last instruction of the same BLI-stream is identified and received by the instruction reorder unit 77. The instruction reorder unit 77 relocates the PBI received from the branch predictor 75 after the last instruction of the same BLI-stream to dynamically maintain compatible instruction decode and execution order in the instruction decoder 78 and the backend processing engines 81.

A single or plurality of NPBIs and/or NBIs in a BLI- or a non-BLI-stream addressed by the inter-SPC is also fetched to the stream fetch unit 71. Since the non-BLI-stream does not include any PBI, the single or plurality of NPBIs and/or NBIs in the non-BLI-stream is bypassed the units 74, 75, 76, used for the instructions, such as PBIs and NPBIs and/or NBIs, in BLI-streams and directly forwarded to the instruction reorder unit 77, which places the NPBIs and/or NBIs in the non-BLI-stream after the reordered last instruction of the BLI-stream or the last instruction of the non-BLI-stream in order to maintain compatible instruction decode and execution order.

The branch predictor 75 forwards a predicted branch target address to the stream PCs 54 for initiating next BLI- or non-BLI-stream fetch operation when predicting a taken-branch of a PBI. Once the BLIF system 53 initiates a fetch operation from the branch target location, a single or plurality of instructions in the BLI- or the non-BLI-stream at the branch target location is fetched from the L1 BLI caches 43. The L1 BLI caches 43 fetch a single or plurality of the instructions to the BLIF system 53 if the addressed instructions are found in the L1 BLI caches 43. Otherwise, the BLIF system 53 sends a request to the BLIP system 51 to prefetch the missing instructions from the L2 BLI caches 42 or from the main BLI memories 41. This prefetch request operation is initiated by updating the stream PCs 52 in the BLIP system 51. The stream PCs 52, 54, respectively, contains addresses of instructions to fetch and prefetch.

The BLIF system 53 fetches a PBI in a loop BLI-stream representing a loop comprising the PBI followed by a single or plurality of NPBIs and/or NBIs. More specifically, the fetched PBI and the single or plurality of NPBIs and/or NBIs are not prefetched and fetched again from the BLIM system 40, but accessed directly from the stream fetch unit 11. The stream fetch unit 71 includes a single of plurality of entries of storage, such as multiple-entry instruction queues, for holding all of the instructions in the loop BLI-stream. The instructions stored in the instruction queues are accessed from the entry addressed by the intra-SPC 73. The PBI of the loop BLI-stream is delivered to the branch predictor 75 via the PBI decode unit 74. The other NPBIs and/or NBIs of the loop BLI-stream are forwarded to the end of BLI-stream identifier 76 and then to the instruction reorder unit 77.

The stream PCs 54 in the BLIF system 53 and the stream PCs 52 in the BLIP system 51 synchronize with an address of the next BLI- or non-BLI-stream if any BLI-stream is predicted by the branch predictor 75. More specifically, the BLIF system 53 uses the BLI- or non-BLI-stream address updated by itself or synchronizes with the BLI- or non-BLI-stream address transmitted from the inter SPC 72 in the stream fetch unit 71 in the BL microprocessor 70 whenever fetching a plurality of BLI- and/or non-BLI-streams in parallel. A BLI- or non-BLI-stream address is an address of the first instruction of the BLI- or non-BLI-stream. The BLIF system 53 synchronizes with the corrected address of the BLI- or non-BLI-stream predicted from the BL microprocessor 70 in order to correct the mispredicted PBI.

In one embodiment, a branch predictor 75, an interrupt processor 79, stack memory 80, and other useful hardware components comprised in the BL microprocessor 70 are found in prior arts. The BL microprocessor 70 also supports any disrupted operations supported in prior arts, such as an interrupt and branch misprediction.

The NPBI or NBI fetch address does not necessary to be transmitted from the BL microprocessor 70 to the BLIF system unless any BLI- or non-BLI-stream fetch operations is interrupted or disrupted. In this case, a fetch address of the NPBI or NBI in the disrupted BLI- or non-BLI-stream for resuming the next fetch address of the NPBI or NBI in the disrupted BLI- or non-BLI-stream is received from the intra SPC 73 in the stream fetch unit 71 to the BLIF system 53 while the stream fetch unit 71 also recovers the next fetch address of the NPBI or NBI in the disrupted BLI- or non-BLI-stream and transmits the next fetch address of the NPBI or NBI in the disrupted BLI- or non-BLI-stream to the BLIF system 53.

In one embodiment, the stream fetch unit 71 receives a single or plurality of BLI- and/or non-BLI-streams from the BLIF system 53 and stores the BLI- and/or non-BLI-streams to a single or plurality of stream fetch units 71. The stream fetch unit 71 also receives a single or plurality of branch predicted fetch addresses from the branch predictor 75. The stream fetch unit 71 also receives the next BLI- and/or non-BLI-stream fetch addresses from the interrupt processor 79 for branching to an interrupt service routine, the stack memory 80 for returning from a subroutine, or the backend processing engines 81 for correcting branch misprediction of a BLI-stream and any other disrupted operations occurred from the BL microprocessor 70.

The stream fetch unit 71 forwards a single of plurality of the PBIs of the BLI-streams to the branch predictor 75. The stream fetch unit 71 transmits the next BLI- and/or non-BLI-stream fetch address to the BLIF system 53 whenever a PBI of the BLI-stream is fetched, a mispredicted PBI of the BLI-stream needs to be corrected, or any PBI of the BLI-stream fetch operations are interrupted or disrupted.

In one embodiment, the PBI decode unit 74 receives a single or plurality of PBIs of the BLI-streams from a single or plurality of the stream fetch units 71. The PBI decode unit 74 continues to forwards the received single or plurality of PBIs of the BLI-streams to the branch predictor 75. The PBI decode unit 74 forwards NPBIs and NBIs of the BLI-streams to the end of BLI-stream identifier 76. Unlike BLI-streams, a single or plurality of NPBIs and NBIs of the non-BLI-streams is forwarded from the stream fetch unit 71 to the instruction reorder unit 77.

The PBI decode unit 74 decodes a single or plurality of the PBIs received concurrently. The PBI decode unit 74 forwards the PBI decoded output to the branch predictor 75 in order to update the branch predictor 75.

The PBI decode unit 74 also initiates to fetch again the NPBIs/NBIs of the associated BLI-stream to the stream fetch unit 71 if the NPBIs/NBIs of the associated BLI-stream previously fetched are changed. More specifically, the PBI decode unit 74 decodes any interrupted or disrupted PBIs fetched from the interrupt processor 79 for processing any interrupts or from the backend processing engines 81 for correcting mispredicted PBIs via the stream fetch unit 71. Similarly, the PBI decode unit 74 decodes any PBIs that resume to fetch again the NPBIs/NBIs of the associated BLI-stream from the stack memory 80 or any storages employed for this purpose via the stream fetch unit 71 for recovering the interrupted the NPBIs/NBIs of the associated BLI-stream and for resuming next NPBIs/NBIs of the associated BLI-stream fetch after processing the interrupted or disrupted PBIs.

In one embodiment, the branch predictor 75 receives a single or plurality of the PBIs for predicting the target addresses of the PBIs from the PBI decode unit 74. The branch predictor 75 initiates PBI branch prediction a single of plurality of clock cycles ahead. The branch predictor 75 produces the PBI branch prediction results a plurality of clock cycles ahead to initiate the next BLI- or non-BLI-stream fetch operations and hides taken-branch prediction latencies.

More specifically, the PBI decode unit 74 decodes a PBI of a BLI-stream representing a loop. The branch predictor 75 reissues the same BLI-stream representing the same loop while the stream fetch unit 71 holds further BLI- or non-BLI-stream fetch operation. Therefore, recursive BLI- or non-BLI-stream prefetch and fetch operations from the BL hardware systems 60 are eliminated.

In one embodiment, the interrupt processor 79 receives any interrupt and exception requests from outside and/or inside of the BL microprocessor 70. The interrupt processor 79 disrupts the PBI/NPBI/NBI operations in BLI or non-BLI-stream processed in the BL microprocessor 70. The interrupt processor 79 temporarily saves necessary information for recovering the disrupted PBI/NPBI/NBI operations in BLI or non-BLI-stream processed in the BL microprocessor 70 to the stack memory 80 or any storages employed for this purpose. The interrupt processor 79 also initiates prefetch and fetch operations of new PBIs and NPBIs and/or NBIs in BLI-streams or NPBIs and/or NBIs in non-BLI-streams by updating addresses of the BLI- or non-BLI-streams of the interrupt service routines. The interrupt processor 79 restores the disrupted PBIs and NPBIs and/or NBIs in BLI-streams or NPBIs and/or NBIs in non-BLI-streams from the stack memory 80 or any storage employed for this purpose to the stream fetch unit 71 after completing the interrupt processing operations. The interrupt processor 79 also processes any other interrupt-related operations usually found in prior arts.

In one embodiment, the stack memory 80 stores the information for recovering from any interrupted or disrupted operations initiated by the interrupt processor 79 or by any components installed in the BL microprocessor 70. The recovered information includes for resuming the disrupted fetch, decode, and any other operations of PBIs and NPBIs and/or NBIs in BLI-streams or NPBIs and/or NBIs in non-BLI-streams disrupted before.

The stack memory 80 retrieves the information stored when the interrupted or disrupted operations are occurred and forwards the retrieved information to the stream fetch unit 71 after completing the interrupted or disrupted operations.

In one embodiment, the stream fetch unit 71 receives a single or plurality of NPBIs and/or NBIs in non-BLI-streams from the BLIF system 53. The stream fetch unit 71 forwards the NPBIs and/or NBIs in non-BLI-streams fetched to the instruction reorder unit 77 for decoding the instructions in compatible order. The stream fetch unit 71 updates any pointers, such as inter- and/or inter-SPCs 72, 73, to fetch next BLI- or non-BLI-streams or next NPBIs or NBIs in non-BLI-streams currently fetching. The stream fetch unit 71 also updates any pointers, such as inter- and/or intra-SPCs 72, 73, to fetch next BLI- or non-BLI-streams or next NPBIs or NBIs in non-BLI-streams after fetching the last instructions of the current BLI- and/or non-BLI-streams fetched. Alternatively, the stream fetch unit 71 updates any pointers, such as inter- and/or intra-SPCs 72, 73, to fetch next BLI- or non-BLI-streams or next NPBIs or NBIs in non-BLI-streams whenever fetching the first instructions of the current BLI- and/or non-BLI-streams fetched.

In one embodiment, the instruction decoder 78 receives a single or plurality of PBIs/NPBIs/NBIs 34 from the instruction reorder unit 77. The instruction decoder 78 decodes PBIs/NPBIs/NBIs 34 as instruction decoding operations found in prior art and forwards the PBIs/NPBIs/NBIs 34 decoded to the backed processing engines 81. The instruction decoder 78 decodes the variable-length instructions in order to extract addresses of the variable-length instructions if variable-length native instructions are decoded. In one embodiment, the backend processing engines 81 generally comprise stages of instruction issue, execution, data access, and result write-back on the pipeline.

FIG. 3 is a diagram showing one embodiment of operations of a plurality of BLI-streams for pipelined-parallel look-ahead branch prediction, prefetches and fetches, and executions on the BL microprocessor 70 integrated with the BL hardware system 60.

Three BLI-streams comprise a BLI-stream comprising a PBI followed by twelve NPBI and/or NBIs, a BLI-stream comprising a PBI followed by eight NPBI and/or NBIs, and a BLI-stream comprising a PBI followed by four NPBI and/or NBIs. Two microprocessors without the BL hardware system 60 and the components used for the BL microprocessor 70 comprise a double-fetcher, double-decoder, and double-issuer on an in-order superscalar pipelined architecture 90 and a quad-fetcher, triple-decoder, and triple-issuer on an out-of-order superscalar processor 91. The same two different microprocessors are modified as the BL microprocessors shown in 92, 93, respectively.

The double-fetcher, double-decoder, and double-issuer on an in-order superscalar pipelined architecture microprocessor 90 overlaps (1) the instruction fetch and branch prediction operations to (2) the instruction issue and execution operations shown as a double-overlapping branch prediction scheme. This double-overlapping scheme cannot hide two-cycle of the taken-branch prediction latency of each branch instruction, such as B1 101, B2 103, and B3 105. The branch latencies, B1 101, B2 103, and B3 105, are appeared between the instruction fetch cycles shown as F1 100, F2 102, and F3 104. The two-cycle prediction latencies are appeared on B1 101, B2 103, and B3 105. Each unhidden two-cycle branch prediction delay, D1 107, D2 109, or D3 111, is shown after each associated execution cycle, E1 106, E2 108, or E3 110.

The quad-fetcher, triple-decoder, and triple-issuer on an out-of-order superscalar pipelined architecture microprocessor 91 overlaps (1) the instruction fetch and branch prediction operations to (2) the instruction issue and execution operations shown as a double-overlapping branch prediction scheme. This double-overlapping scheme cannot hide two-cycle of the taken-branch prediction latency of each branch instruction, such as B1 121, B2 123, and B3 125. The branch latencies, B1 121, B2 123, and B3 125, are appeared between the instruction fetch cycles shown as F1 120, F2 122, and F3 124. The two-cycle prediction latencies are appeared on B1 121, B2 123, and B3 125. Each unhidden one-cycle branch prediction delay, D1 127, D2 129, or D3 131, is shown after each associated execution cycle, E1 126, E2 128, or E3 130.

The double-fetcher, double-decoder, and double-issuer on an in-order superscalar pipelined architecture BL microprocessor 92 overlaps (1) the instruction fetch operations, (2) the branch prediction operations, and (3) the instruction issue and execution operations shown as a triple-overlapping branch prediction scheme. This triple-overlapping scheme can hide two-cycle of the taken-branch prediction latency of each branch instruction, such as B1 140, B2 142, and B3 144. The branch latencies, B1 140, B2 142, and B3 144, are appeared between the idling cycles shown as I1 141 and I2 143. No prediction latency is appeared on the instruction fetch cycles, F1 145, F2 146, and F3 147. There is no unhidden branch prediction delay found on associated instruction execution cycle, E1 148, E2 149, or E3 150.

The quad-fetcher, triple-decoder, and triple-issuer on an out-of-order superscalar pipelined architecture BL microprocessor 93 overlaps (1) the instruction fetch operations, (2) branch prediction operations, and (3) the instruction issue and execution operations shown as a triple-overlapping branch prediction scheme. This triple-overlapping scheme can hide two-cycle of the taken-branch prediction latency of each branch instruction, such as B1 160, B2 162, and B3 163. The branch latencies, B1 160 and B2 162, are appeared before and after the idling cycle shown as I1 161. No prediction latency is appeared on the instruction fetch cycles, F1 164, F2 165, and F3 166. Another idling cycle shown as I2 167 is appeared during the fetch operation. There is no unhidden branch prediction delay found on associated instruction execution cycle, E1 168, E2 169, or E3 170.

What is claimed is:

1. A branch look-ahead (BL) computing system comprising:
   a branch look-ahead compilation (BLC) software system;
   a branch look-ahead (BL) hardware system; and
   a branch look-ahead (BL) microprocessor; wherein the BL computing system is operable to:
      transform instruction sequences to branch look-ahead instruction sequences by relocating prediction-required branch instructions (PBIs) at the last instructions of the instruction sequences to the first instruction of the instruction sequences and by shifting a single or plurality of the remaining instructions of the instruction sequences after the relocated PBIs, wherein the BLI-streams are transformed instruction sequences that start with the PBIs;
      fetch the branch look-ahead instruction sequences to the BL microprocessor in a look-ahead manner, wherein the look-ahead manner delivers PBIs before or at least the same time of the last instructions of the branch look-ahead instruction sequences;
   predict paths of subsequent instruction sequences with the PBIs;
   reorder the PBIs to the last instructions of the instruction sequences fetched to the BL microprocessor;
   decode the instruction sequences comprising the PBIs reordered;
   execute the decoded instruction sequences comprising the decoded PBIs to produce compatible execution results of the branch look-ahead instruction sequences in back-end processing engines of the BL microprocessor;
   wherein the BLC software system is further operable to:
      classify instructions in a compiled software program according to branch operations of the instructions, wherein the classified instructions comprise (1) a PBI comprising a conditional branch instruction, wherein the conditional branch instruction requires to be predicted to determine its branch-taken or branch-not-taken operation, its branch-target location, and any useful information related to its branch operation, (2) a non-prediction-required branch instruction (NPBI) comprising an unconditional jump instruction, wherein the NPBI does not need to be predicted, and (3) a non-branch-instruction (NBI) wherein the NBI comprising an instruction that does not require any branch operations;
      classify instruction sequences in the compiled software program according to types of the instruction sequences comprising PBIs, NPBIs, and/or NBIs, wherein the instruction sequences are instruction streams (i-streams);
      transform an i-stream to a branch look-ahead i-stream (BLI-stream) by relocating the PBI at the last instruction of the i-stream to the first instruction of the i-stream and by shifting a single or plurality of remaining instructions of the i-stream after the relocated PBI, wherein the BLI-stream is an instruction sequence started with a PBI;

classify an i-stream to a non-branch look-ahead i-stream (NBLI-stream), wherein the NBLI-stream is an instruction sequence comprising at least an NPBI, but not comprising any PBI in the compiled software program;

classify an i-stream to a non-branch i-stream (NBI-stream), wherein the NBI-stream is an instruction sequence comprising a single or plurality of NBIs in the compiled software program;

comprise a PBI of a BLI-stream comprising an opcode to distinguish the PBI from other instructions, wherein the other instructions are NPBIs and NBIs, and information further comprising the last instruction of the BLI-stream, a branch target location, and a look-ahead branch prediction, wherein look-ahead branch prediction is a PBI of the fetched BLI-stream before fetching the remaining instructions of the BLI-stream;

prefetch and/or fetch i-streams comprising BLI-streams, non-BLI-streams, or NBI-streams from predicted paths by the look-ahead branch prediction; and comprise a single or plurality of the BLI-streams, NBLI-streams, and/or NBI-streams representing a single or plurality of levels of loops in the compiled software program;

wherein the BL hardware system is further operable to:

allocate instructions of i-streams comprising BLI-streams, NBLI-streams, and/or NBI-streams to an accessible main BLI memory in a branch look-ahead instruction memory (BLIM) system;

access a single or plurality of instructions of i-streams comprising BLI-streams, NBLI-streams, and/or NBI-streams from the accessible main BLI memory to accessible BLI caches in the BLIM system;

perform look-ahead instruction prefetches, wherein the look-ahead instruction prefetch is to identify a single or plurality of paths of a subsequent i-stream in advance and then prefetch instructions of a current i-stream by prefetching a branch instruction of the current i-stream before prefetching the instructions of the current i-stream;

perform look-ahead instruction fetches, wherein the look-ahead instruction fetch is to identify a path of a subsequent i-stream in advance and then fetch instructions of a current i-stream before fetching the instructions of the current i-stream;

perform look-ahead branch prediction, wherein the look-ahead branch prediction is to fetch a branch instruction of a current i-stream in advance and then predict a path of the current i-stream and then fetch instructions of the current i-stream;

overlap the look-ahead branch predictions and the look-ahead instruction prefetches and the look-ahead instruction fetches;

access a single or plurality of instructions of i-streams comprising BLI-streams, NBLI-streams, and/or NBI-streams from the accessible BLI caches to the BL microprocessor;

prefetch the i-streams comprising BLI-streams, NBLI-streams, and/or NBI-streams from the main BLI memory and/or an L2 BLI cache to an L1 BLI cache, wherein the L2 BLI cache is the level two BLI cache memory, wherein the L1 BLI cache is the level one BLI cache memory;

terminate a single or plurality of prefetches of the i-streams comprising the BLI-streams, non-BLI-streams, and/or NBI-streams after prefetching a single or plurality of times the i-streams comprising the BLI-streams, NBLI-streams, and/or NBI-streams from both of a branch-target path and a fall-through path, wherein the fall-through path comprises a subsequent i-stream of the i-stream;

resume a single or plurality of prefetches of i-streams comprising BLI-streams, non-BLI-streams, and/or NBI-stream when the L1 BLI cache is missed;

decode the prefetched PBIs of the BLI-streams and the prefetched NPBIs;

prefetch subsequent i-streams comprising BLI-streams, NBLI-streams, and/or NBI-streams via a PBI/NPBI decoder and stream program counters (PCs) in a branch look-ahead instruction prefetch (BLIP) system;

access a single or plurality of instructions of i-streams comprising BLI-streams, NBLI-streams, and/or NBI-streams via the L1 and L2 BLI caches, wherein accessing said instructions of the i-streams comprising the BLI-streams, the NBLI-streams, and/or the NBI-streams via the L1 and L2 BLI caches is further operable in a pipelined parallel manner;

perform look-ahead fetching of i-streams comprising BLI-streams, NBLI-streams, and/or NBI-streams addressed by a branch look-ahead instruction fetch (BLIF) system to the BL microprocessor upon a single or plurality of branch-target addresses is obtained from a single or plurality of the BL microprocessors;

decode the fetched PBIs of the BLI-streams and the prefetched NPBIs;

fetch subsequent i-streams comprising BLI-streams, NBLI-streams, and/or NBI-streams via the PBI/NPBI decoder and the stream PCs in the BLIF system;

perform look-ahead prefetch and fetch operations of subsequent i-streams comprising BLI-streams, NBLI-streams, and/or NBI-streams according to the branch prediction results;

fetch a plurality of PBIs from a plurality of BLI-streams to a single or plurality of the BL microprocessors;

fetch a plurality of the PBIs to a single or plurality of branch predictors in the BL microprocessors;

predict a single or plurality of locations of subsequent i-streams comprising BLI-streams, NBLI-streams, and/or NBI-streams;

fetch a single or plurality of the remaining instructions of the BLI streams to the BL microprocessors;

identify PBIs of BLI-streams representing a single or plurality of levels of loops (loop BLI-streams) by the PBI/NPBI decoder in the BLIF system;

reuse said PBIs of the BLI-streams representing said loops without fetching the PBIs from subsequent i-streams if the PBIs of the BLI-streams represent said loops and predict to continue said loops, and otherwise, resume to fetch PBIs from subsequent i-streams, and perform the look-ahead branch prediction of the loops;

process any disrupting prefetch and/or fetch operations of the i-streams comprising BLI-streams, NBLI-streams, and/or NBI-streams caused by branch predictors, interrupt processors, or any other units in the BL microprocessors;

resume the prefetch and/or fetch operations of the i-streams comprising BLI-streams, NBLI-streams, and/or NBI-streams by recovering the disrupted prefetch and/or fetch operations of the i-streams comprising the BLI-streams, the NBLI-streams, and/or the NBI-streams if disrupting prefetch and/or fetch operations are completed; and overlap the latencies related to the branch prediction, wherein the latencies related to the branch prediction comprise taken-branch prediction latency, instruction fetch time, and instruction execution time;

wherein the BL microprocessor is further operable to:

fetch i-streams comprising BLI-streams, NBLI-streams, and/or NBI-streams according to the addresses obtained from an inter-stream program counter (inter-SPC) in a stream fetch unit;

forward the i-streams comprising the BLI-streams, the NBLI-streams, and/or the NBI-streams to a PBI decode unit to identify the BLI-streams before (1) forwarding PBIs to branch predictors, (2) forwarding the remaining instructions of the BLI-streams to an end of a BLI-stream identifier, or (3) forwarding instructions of the NBLI-streams and NBI-streams to an instruction reorder unit;

perform look-ahead branch prediction operations of the PBIs received with the branch predictors;

produce a single or plurality of look-ahead branch prediction results of the PBIs of the BLI-streams from the branch predictor;

forward the look-ahead branch prediction results to the stream fetch unit;

update the inter-SPCs and/or intra-stream program counters (intra-SPCs) in the stream fetch unit;

initiate fetch operations of the i-streams predicted by the branch predictors;

identify the last instruction of the BLI-streams;

reorder the predicted PBIs after the last instructions of the BLI-streams are identified;

decode the reordered BLI-streams, the fetched NBLI-streams, and the fetched NBI-streams;

execute the PBIs with the backend processing engines verify the look-ahead branch prediction results with the backend processing engines;

forward any branch misprediction results from the backend processing engines to the interrupt processors;

perform interrupts and disrupting operations detected in the BL microprocessor;

identify PBIs of BLI-streams representing a single of plurality of loop BLI-streams by the PBI decoder in the BL microprocessor;

reuse said PBIs of the BLI-streams representing said loops without fetching the PBIs from subsequent i-streams if the PBIs of the BLI-streams represent said loops and predict to continue said loops, and otherwise, resume to fetch PBIs from subsequent i-streams, and perform the look-ahead branch prediction of the loops;

process any disrupting prefetch and/or fetch operations of i-streams comprising BLI-streams, NBLI-streams, and/or NBI-streams caused by branch predictors, interrupt processors, or any units in the BL microprocessors;

store recovering information of disrupted operations to the stack memory;

process prefetch and/or fetch instructions of disrupting i-streams comprising BLI-streams, NBLI-streams, and/or NBI-streams;

restore the recovering information of the disrupted operations from the stack memory;

decode a PBI relocated to the last of the BLI-stream reordered with the instruction decoder; and transmit a single of plurality of addresses of i-streams comprising BLI-streams, NBLI-streams, and/or NBI-streams to the BL hardware system upon receiving the addresses of the i-streams comprising the BLI-streams, the NBLI-streams, and/or the NBI-streams from the branch predictors, the interrupt processors, or any units in the BL microprocessor.

2. The BL computing system of claim 1, wherein the BLC software system is further operable to:

generate i-streams comprising BLI-streams, NBLI-streams, and/or NBI-streams of the compiled software program comprising applications and/or operating systems written in high-level programming languages, assembly program compiled with target instruction sets, or executable code to run on the BL microprocessors;

generate a BLI-stream representing an i-stream comprising a PBI and an instruction sequence comprising a single or plurality of NPBIs and/or NBIs;

generate a NBLI-stream representing an i-stream comprising a single or plurality of NPBIs and/or NBIs;

generate a NBI-stream representing an i-stream comprising a single or plurality of NBIs;

generate a single-level loop BLI-stream comprising a BLI-stream representing a single-level loop;

generate a multiple-level loop BLI-stream, comprising a plurality of single-level loop BLI-streams with or without NBLI-streams and/or NBI-streams between the single-level loop BLI-streams; and encode a PBI comprising a plurality of fields to (1) identify the PBI, (2) access a single or plurality of the i-streams comprising the BLI-streams, NBLI-streams, and/or NBI-streams, and/or the NBI-streams in sequence or parallel, (3) identify look-ahead branch prediction of the PBI, and/or (4) identify information comprising a target branch location.

3. The BL computing system of claim 1, wherein the BL hardware system further comprises:

a BLIM system and a branch look-ahead memory management unit (BLMMU);

wherein the BL hardware system is operable to:

prefetch and fetch i-streams comprising BLI-streams, NBLI-streams, and/or NBI-streams from the BLIM system to the BL microprocessor via a BLIP system and a BLIF system in the BLMMU;

access instructions of the i-streams in advance by performing look-ahead branch predictions; and overlap the look-ahead branch predictions and accesses of the instructions of the i-streams.

4. The BL hardware system of claim 3, wherein the BLIM system further comprises:

a single or plurality of the BLIM systems further comprises:

a single or plurality of main BLI memories;

a single or plurality of L2 BLI caches; and a single or plurality of L1 BLI caches;

wherein the BLIM systems is operable to:

allocate instructions of i-streams comprising BLI-streams, NBLI-streams, and/or NBI-streams to different locations of the main BLI memories accessible in sequence and/or parallel;

prefetch said instructions of the i-streams from the main BLI memories to the L2/L1 BLI caches and/or from the L2 BLI caches to the L1 BLI caches at a single or plurality of addresses received from BLIP systems in the BLMMU;

prefetch a single or plurality of instructions of an i-streams from a branch-target path and a fall-through path to the BLI caches in the look-ahead manner;

resume prefetching a single or plurality of instructions of an i-stream from a branch-target path and a fall-through path in the look-ahead manner upon receiving a look-ahead branch prediction result;

resume prefetching a single or plurality of instructions of an i-stream from a branch-target path and a fall-through path in the look-ahead manner upon detecting a cache miss;

prefetch a single or plurality of instructions from an i-stream from a single or plurality of addresses in the look-ahead manner;

prefetch a single or plurality of instructions from a single or plurality of different i-streams from a single or plurality of addresses in the look-ahead manner; fetch i-streams comprising BLI-streams, NBLI-streams, and/or NBI-streams from the L1 BLI caches at the addresses received from the BLIF systems in the BLMMU in the BL hardware system to stream fetch units in the BL microprocessors;

fetch a single or plurality of instructions of a single or plurality of BLI-streams from a single or plurality of branch predicted paths in the look-ahead manner;

resume fetching a single or plurality of instructions of an i-stream from a branch predicted path or a fall-through path in the look-ahead manner upon receiving a look-ahead branch prediction result;

resume fetching a single or plurality of instructions of an i-stream from a path addressed upon detecting a disrupted address received from the BL microprocessor;

fetch consecutive instructions of i-streams comprising BLI-streams, NBLI-streams, and/or NBI-streams until the last instructions of the i-streams, wherein the last instructions of the i-streams are determined by the BLC software system; and fetch consecutive instructions of i-streams comprising BLI-streams, NBLI-streams, and/or NBI-streams until next PBI or NPBI.

5. The BL hardware system of claim 3, wherein the BLMMU further comprises:

a single or plurality of the BLIP systems; and
a single or plurality of the BLIF systems;
wherein the BLMMU is operable to:

prefetch and/or fetch instructions of i-streams comprising BLI-streams, NBLI-streams, and/or NBI-streams allocated in the different locations of a single or plurality of the BLIM systems in the look-ahead manner;

prefetch a single or plurality of instructions of an i-stream from a branch-target path and a fall-through path to the BLI caches in the look-ahead manner;

prefetch a single or plurality of instructions of a single or plurality of i-streams from a single or plurality of branch-target paths and a single or plurality of fall-through paths to the BLI caches in the look-ahead manner;

prefetch and/or fetch instructions of the i-streams located right after branch instructions and instructions of i-streams comprising BLI-streams, NBLI-streams, and/or NBI-streams at the branch target locations of the branch instructions;

terminate prefetch operations of said instructions of the i-streams from both of a branch-target path and a fall-through path;

fetching instructions of i-streams comprising BLI-streams, NBLI-streams, and/or NBI-streams addressed by the BLIF system to the BL microprocessor upon receiving a branch-target address from the BL microprocessor;

resume prefetch and/or fetch operations of instructions of i-streams comprising BLI-streams, NBLI-streams, and/or NBI-streams addressed with branch prediction results received from the BL microprocessor;

identify PBIs of BLI-streams representing a single or plurality of levels of loops a PBI/NPBI decoder in the BLIF system;

reuse said PBIs of the BLI-streams representing said loops without fetching the PBIs from subsequent i-streams if the PBIs of the BLI-streams represent said loops and predict to continue said loops, and otherwise, resume to fetch PBIs from subsequent i-streams;

process any disrupting prefetch and/or fetch operations of i-streams comprising BLI-streams, NBLI-streams, and/or NBI-streams caused by branch predictors, interrupt processors, or any units in the BL microprocessors; and resume prefetch and/or fetch operations of the i-streams comprising BLI-streams, NBLI-streams, and/or NBI-streams by recovering the disrupted prefetch and/or fetch operations of the i-streams if the disrupting prefetch and/or fetch operations are completed.

6. The BLMMU of claim 5, wherein a single or plurality of the BLIP systems further comprises:

a modified wrong path prefetcher;
a PBI/NPBI decoder; and
a single or plurality of stream PCs; wherein a single or plurality of the BLIP systems is operable to:

prefetch instructions of i-streams comprising BLI-streams, NBLI-streams, and/or NBI-streams from a main BLI memory and/or an L2 BLI cache to an L1 BLI cache;

prefetch said instructions of the i-streams from both a branch predicted path and a non-predicted path in the look-ahead manner;

terminate prefetch operations of said instructions of the i-streams to the BLI caches via the modified wrong path prefetcher in the BLIP system if a single or plurality of BLI-streams is prefetched, and otherwise, continue prefetch operations of NBLI-streams and NBI-streams;

decode PBIs or NPBIs prefetched to obtain addresses of next instructions of i-streams comprising BLI-streams, NBLI-streams, and/or NBI-streams in the PBI/NPBI decoder;

receive a single or plurality of addresses of disrupted instructions of i-streams comprising BLI-streams, NBLI-streams, and/or NBI-streams from the PBI/

NPBI decoders, wherein the addresses of the disrupted instructions of the i-streams comprise branch target addresses;

prefetch instructions of subsequent i-streams comprising BLI-streams, NBLI-streams, and/or NBI-streams;

receive a single or plurality of addresses of disrupted instructions of i-streams comprising BLI-streams, NBLI-streams, and/or NBI-streams from the BL microprocessor, wherein the addresses of the disrupted instructions of the i-streams comprise interrupt service routine addresses;

process any disrupting prefetch operations of the i-streams caused by branch predictors, interrupt processors, or any units in the BL microprocessors; and resume prefetch operations of the i-streams if the disrupting prefetch operations are completed.

7. The single or plurality of the BLIP systems of claim 6, wherein the modified wrong path prefetcher is operable to:

receive a single or plurality of branch target addresses of PBIs or NPBIs from a PBI/NPBI decoder, wherein the PBI/NPBI decoder decodes the branch target addresses from PBIs of BLI-streams or NPBIs of NBLI-streams;

prefetch a single or plurality of i-streams comprising BLI-streams, NBLI-streams, and/or NBI-streams at a branch target address and at a subsequent instruction address of the last instruction of a BLI-stream in a look-ahead manner if the branch target address of the PBI of the BLI-stream is received, prefetch an i-stream comprising a BLI-stream, an NBLI-stream, or an NBI-stream at the branch target address of an NBLI-stream in a look-ahead manner if the branch target address of an NPBI of the NBLI-stream is received, and otherwise, prefetch an i-stream comprising a BLI-stream, an NBLI-stream, or an NBI-stream at subsequent instruction address of the last instructions of the NBI-stream;

terminate prefetch operations of a single or plurality of i-streams comprising BLI-streams, NBLI-streams, and/or NBI-streams at subsequent addresses of the last instructions of the i-streams if any branch target addresses of the PBIs or of the NPBIs are not received, and otherwise, prefetch a single or plurality of i-streams comprising BLI-streams, NBLI-streams, and/or NBI-streams at subsequent instruction addresses of the last instructions of the NBI-streams upon prefetching the last instructions of the NBI-streams; and resume prefetch operations of a single or plurality of i-streams comprising BLI-streams, NBLI-streams, and/or NBI-streams by updating stream PCs in the BLIP systems if a prefetch request is received from BLIF systems, resume prefetch operations of a single or plurality of i-streams comprising BLI-streams, NBLI-streams, and/or NBI-streams if any cache misses of L2 or L1 BLI caches are detected, and resume prefetch operations of a single or plurality of i-streams comprising BLI-streams, NBLI-streams, and/or NBI-streams if any disrupted address of an instruction of an i-stream comprising a BLI-stream, a NBLI-stream, or a NBI-stream is forwarded from the BL microprocessor via the BLIF system, wherein said modified wrong path prefetcher is further operable to terminate prefetch operations of a single or plurality of BLI-streams if a single or plurality of BLI-streams is prefetched, and otherwise, continue prefetch operations of NBLI-streams and NBI-streams.

8. A single or plurality of the BLIP systems of claim 6, wherein the PBI/NPBI decoder and the stream PCs are operable to:

decode prefetched PBIs of the BLI-streams with the PBI/NPBI decoder;

provide branch-target addresses obtained to the modified wrong path prefetcher;

initiate a plurality of look-ahead prefetches from the branch-target addresses and from fall-through paths of the BLI-streams are prefetched, initiate a plurality of look-ahead prefetches from the branch-target addresses if NBLI-streams are prefetched, and otherwise, initiate a plurality of prefetches from fall-through paths of NBI-streams;

continue to prefetch the remaining instructions of i-streams;

update subsequent prefetch addresses to the stream PCs upon prefetching the last instructions of i-streams comprising BLI-streams, NBLI-streams, and/or NBI-streams; and resume prefetch operations of instructions of subsequent i-streams comprising BLI-streams, NBLI-streams, and/or NBI-streams.

9. The BLMMU of claim 5, wherein a single or plurality of the BLIF systems further comprises:

a branch look-ahead instruction fetcher;

a PBI/NPBI decoder; and a single or plurality of stream PCs;

wherein a single or plurality of the BLIF systems is operable to:

receive a single or plurality of addresses from the BL microprocessors;

store a single or plurality of the addresses received to a single or plurality of the stream PCs;

fetch a single or plurality of instructions of i-streams comprising BLI-streams, NBLI-streams, and/or NBI-streams at the addresses from the L1 BLI caches to the BL microprocessors;

identify types of the i-streams fetched from the L1 BLI caches, wherein a BLI-stream is identified, then fetch a PBI of the BLI-stream to a stream fetch unit in the BL microprocessor;

fetch the remaining instructions of the BLI-stream to the stream fetch unit in the BL microprocessor;

receive a branch-target address of the PBI fetched from a branch predictor in the BL microprocessor; and store the branch-target address to the stream PC, wherein an NBLI-stream is identified, then decode an NPBI of the NBLI-stream with the PBI/NPBI decoder;

obtain a branch target address from the PBI/NPBI decoder;

store the branch target address to the stream PC; and fetch the remaining instructions of the NBLI-stream to the stream fetch unit in the BL microprocessor, wherein an NBI-stream is identified, then fetch instructions of the NBI-stream to the stream fetch unit in the BL microprocessor; and store an address of a subsequent i-stream comprising a BLI-stream, a NBLI-stream, or a NBI-stream to the stream PC;

perform subsequent look-ahead fetch operations of instructions of i-streams comprising BLI-streams, NBLI-streams, and/or NBI-streams at a single or plurality of addresses stored in the stream PCs;

identify PBIs of BLI-streams representing a single or plurality of levels of loops by a PBI/NPBI decoder in the BLIF system;

reuse said PBIs of the BLI-streams representing said loops without fetching the PBIs from subsequent i-streams if the PBIs of the BLI-streams represent said loops and predict to continue said loops, and otherwise, resume to fetch PBIs from subsequent i-stream;

process any disrupting fetch operations of i-streams comprising BLI-streams, NBLI-streams, and/or NBI-streams caused by branch predictors, interrupt processors, or any units in the BL microprocessors; and resume fetch operations of the i-streams comprising BLI-streams, NBLI-streams, and/or NBI-streams by recovering the disrupted fetch operations of the i-streams if the disrupting fetch operations are completed.

10. The BL computing system of claim 1, wherein a single or plurality of BL microprocessors further comprises:

a single or plurality of stream fetch units, wherein a single or plurality of the stream fetch units further comprises a single or plurality of instruction fetch units and a single or plurality of inter-stream program counters (inter-SPCs) and intra-stream program counters (intra-SPCs);

a single or plurality of branch predictors;
a single or plurality of PBI decode units;
a single or plurality of end of BLI-stream identifiers;
a single or plurality of instruction reorder units;
a single or plurality of instruction decoders;
a single or plurality of interrupt processors;
a single or plurality of stack memories; and
a single or plurality of backend processing engines;
wherein a single or plurality of the BL microprocessors for the BL computing system is operable to:

store a single or plurality of instructions of i-streams comprising BLI-streams, NBLI-streams, and/or NBI-streams fetched from a single or plurality of the branch look-ahead hardware systems to the stream fetch units;

wherein a BLI-stream is stored in the stream fetch unit, then forward the PBI stored in the stream fetch unit to the branch predictor via the PBI decode unit;

decode the PBI to predict a branch operation and to produce a branch-target location in the PBI decode unit;

forward the decode results of the PBIs to the branch predictor to produce branch prediction results comprising branch-taken or branch-not-taken, and branch-target address;

perform branch prediction operations of the PBI received from the PBI decode unit to produce branch prediction results;

forward the remaining instructions of the BLI-stream to the instruction reorder unit via the end of BLI-stream identifier;

receive the PBI to the instruction reorder unit after receiving the last instruction of the BLI-stream forwarded via the end of BLI-stream identifier;

forward the reordered instructions of the BLI-stream from the instruction reorder unit to the instruction decoder; and update values of the inter-SPCs with subsequent addresses of i-streams predicted by the branch predictors, wherein a NBLI-stream or a NBI-stream is stored in the stream fetch unit, then forward instructions of the NBLI-stream or the NBI-stream to the instruction decoder via instruction reorder unit and the end of BLI-stream identifier; and update values of the inter-SPCs with next addresses of i-streams by the stream fetch units, wherein a single or plurality of levels of loop BLI-streams are stored in the stream fetch unit, then forward a single or plurality of PBIs to a single or plurality of PBI decode units;

forward a single or plurality of decode results of the PBIs to a single or plurality of branch predictors;

perform branch prediction operations of a single or plurality of the PBIs received to produce branch prediction results of a single or plurality of the PBIs;

forward the remaining instructions of a single or plurality of the BLI-streams to a single or plurality of the instruction reorder units via a single or plurality of the end of BLI-stream identifiers;

receive a single or plurality of the PBIs to a single or plurality of the instruction reorder units after receiving the last instructions of a single or plurality of the BLI-streams forwarded via a single or plurality of the end of BLI-stream identifiers;

forward instructions of a single or plurality of the NBLI-streams or the NBI-streams in a single or plurality of levels of the loop BLI-streams to a single or plurality of the instruction decoders;

forward the reordered instructions of a single or plurality of the BLI-streams from a single or plurality of the instruction reorder units to a single or plurality of the instruction decoders;

update values of the inter-SPCs with subsequent addresses of i-streams predicted by the branch predictors upon forwarding the last instructions of the BLI-streams if the BLI-streams are predicted, and otherwise, update values of the inter-SPCs with subsequent addresses of the NBLI-streams or the NBI-streams by the stream fetch units upon forwarding the last instructions of the NBLI-streams or the NBI-streams;

update values of the intra-SPCs with subsequent addresses of instructions of the i-streams upon forwarding the last instructions of the i-streams; and repeat the instructions of a single or plurality of levels of the loops unless a single or plurality of the PBIs is predicted not to take a single or plurality of branches, wherein instructions of i-streams comprising BLI-streams, NBLI-streams, and/or NBI-streams stored in the stream fetch unit are disrupted by disrupted operations comprising branch misprediction, interrupts, and exceptions by a single or plurality of the interrupt processors, then store recovering information from the disrupted operations to the stack memories, wherein the recovering information comprising said instructions of the i-streams comprising the BLI-streams, the NBLI-streams, and/or the NBI-streams stored in the stream fetch units and values in the inter-SPCs and the intra-SPCs;

perform disrupting operations comprising prefetch and/or fetch of instructions of disrupting i-streams comprising BLI-streams, NBLI-streams, and/or NBI-streams from disrupting addresses;

store a single or plurality of said instructions of the disrupting i-streams comprising the BLI-streams, the NBLI-streams, and/or the NBI-streams fetched from a single or plurality of the branch look-ahead hardware systems to the stream fetch units; and forward said instructions of the disrupting i-streams from the stream fetch units to the instruction decoders until the last instructions of the disrupting i-streams are forwarded to the instruction decoders, wherein said instructions of the disrupting i-streams completing the disrupting operations, then restore the recovering information from the stack memories to the stream fetch units and values in inter-SPCs and intra-SPCs;

transmit a single or plurality of instructions decoded by the instruction decoders to a single or plurality of the backend processing engines; and prefetch and/or fetch instructions of i-streams comprising BLI-streams, NBLI-streams, and/or NBI-streams at a single or plurality of address values stored in the inter-SPCs.

11. A single or plurality of the BL microprocessors of claim 10, wherein a single or plurality of the stream fetch units further comprises:

a single or plurality of the inter-SPCs;
a single or plurality of the intra-SPCs; and
a single or plurality of the instruction fetch units;

wherein the stream fetch units are operable to:

receive a single or plurality of addresses to prefetch and fetch instructions of i-streams comprising BLI-streams, NBLI-streams, and/or NBI-streams from the branch predictors, the interrupt processors, or the backend processing engines;

transmit prefetch and/or fetch said instructions of the i-streams comprising the BLI-streams, NBLI-streams, and/or NBI-streams to the BL hardware system;

fetch a single or plurality of instructions of i-streams comprising BLI-streams, NBLI-streams, and/or NBI-streams from the BLIF systems via the addresses at the BLI caches;

fetch said instructions of the i-streams comprising the BLI-streams, the NBLI-streams, and/or the NBI-streams to the stream fetch units upon receiving new addresses of instructions of i-streams comprising BLI-streams, NBLI-streams, and/or NBI-streams, wherein the stream fetch units fetch instructions of a single or plurality of levels of loop BLI-streams;

manage a single or plurality of addresses of i-streams comprising BLI-streams, NBLI-streams, and/or NBI-streams in the inter-SPC;

manage a single or plurality of addresses of instructions of an i-stream comprising a BLI-stream, an NBLI-stream, and/or an NBI-stream in the intra-SPC;

store the fetched instructions of the i-streams comprising the the BLI-streams, the NBLI-streams, and/or the NBI-streams in a single or plurality of the stream fetch units;

forward a PBI of the BLI-stream to the branch predictor via the PBI decode unit;

forward the remaining instructions of the BLI-stream to the instruction reorder unit via the end of BLI-stream identifier;

append the fetched PBI to the last instruction fetched of the BLI stream received in the instruction reorder unit;

forward the reordered instructions of the BLI-stream to the instruction decoder;

forward a single or plurality of instructions of the NBLI-stream and/or the NBI-stream to the instruction decoder via the instruction reorder unit;

receive a single or plurality of branch predicted addresses of BLI-streams from the branch predictors;

receive a single or plurality of disrupting addresses of i-streams comprising BLI-streams, NBLI-streams, and/or NBI-streams from the interrupt processors, and the backend processing engines, wherein the disrupting addresses comprise corrected addresses of branch mispredicted and interrupt vector addresses;

forward recovering addresses of the disrupted instructions of i-streams comprising BLI-streams, NBLI-streams, and/or NBI-streams to the stack memories;

retrieve a single or plurality of addresses of disrupted i-streams comprising BLI-streams, NBLI-streams, and/or NBI-streams from the stack memories to the inter-SPCs;

retrieve a single or plurality of addresses of said instructions of the disrupted i-stream comprising the BLI-stream, the NBLI-stream, or the NBI-stream from the stack memories to the intra-SPCs;

resume prefetching and/or fetching operations of the disrupted i-streams comprising the BLI-streams, the NBLI-streams, and/or the NBI-streams;

reuse said instructions of the BLI-streams fetched for a single or plurality of levels of loops;

forward the PBIs of the BLI-streams of a single or plurality of levels of the loops to the branch predictors via the PBI decode units; and hold the instruction prefetch and/or fetch operations of the loop BLI-streams from the BLIP systems and/or the BLIF systems until the loop BLI-streams are completed.

12. A single or plurality of the BL microprocessors of claim 10, wherein a single or plurality of the PBI decode units is operable to:

receive a single or plurality of instructions of i-streams comprising BLI-streams, NBLI-streams, and/or NBI-streams from the stream fetch units;

identify the BLI-streams from the i-streams received from the stream fetch units;

decode PBIs of the BLI-streams;

forward decoded results of the PBIs to the branch predictors; and bypass the remaining instructions of the BLI-streams and instructions of the NBLI-streams and/or the NBI-streams to the end of BLI-stream identifiers to identify the last instructions of the BLI-streams.

13. A single or plurality of the BL microprocessors of claim 10, wherein a single or plurality of the branch predictors is operable to:

perform look-ahead branch prediction operations of a single of plurality of PBIs received;

examine the PBIs to predict branch behaviors and branch-target addresses of the PBIs, wherein the branch behaviors comprise taken or not-taken branches;

produce branch-target addresses of the PBIs if the PBIs are predicted to take branches;

forward branch prediction results to the stream fetch units;

forward the PBIs predicted to the instruction reorder units upon receiving requests from the end of BLI-stream identifiers; and receive and update useful information to predict branches from useful units to the associated sub-units comprising branch history tables and branch target buffers.

14. A single or plurality of the BL microprocessors of claim 10, wherein a single or plurality of the end of BLI-stream identifiers is operable to:

identify last instructions of BLI-streams;

transmit a single or plurality of signals to the branch predictors; and forward predicted PBIs of the BLI-streams to the instruction reorder units upon identifying the last instructions of the BLI-streams.

15. A single or plurality of the BL microprocessors of claim 10, wherein a single or plurality of the instruction reorder units is operable to:

receive instructions of BLI-streams, except for PBIs of the BLI-streams;

receive the PBIs of the BLI-streams after receiving the last instructions of the BLI-streams;

append the PBIs to the last instructions of the BLI-streams upon receiving the PBIs; and forward the reordered instructions of the BLI-streams to the instruction decoders.

16. A single or plurality of the BL microprocessors of claim 10, wherein a single or plurality of the instruction decoders is operable to:

receive instructions of i-streams comprising BLI-streams, NBLI-streams, and/or NBI-streams;

decode said instructions of the i-streams comprising the BLI-streams, the NBLI-streams, and/or the NBI-streams; and forward decoded results of said instructions of the i-streams comprising the BLI-streams, the NBLI-streams, and/or the NBI-streams to the backend processing engines.

17. A method for producing a branch look-ahead (BL) computing system comprising:

a branch look-ahead compilation (BLC) software system;
a branch look-ahead (BL) hardware system; and
a branch look-ahead (BL) microprocessor;

wherein the method for operating the BL computing system is operable to:

identify branch look-ahead operations of instruction sequences, wherein the instruction sequences are instruction streams (i-streams), wherein the i-streams are prefetched and fetched from consecutive instructions;

transform an i-stream to a branch look-ahead i-stream (BLI-stream) by relocating prediction-required branch instruction (PBI) at the last instruction of the i-stream to the first instruction of the i-stream and by shifting a single or plurality of the remaining instructions of the i-stream after the relocated PBI, wherein the BLI-stream is a transformed instruction sequence that starts with a PBI;

fetch a single or plurality of instructions of the i-stream in sequence and/or parallel to the BL microprocessor;

said fetching of a single or plurality of instructions of the BLI-stream in a look-ahead manner to the BL microprocessor, wherein the look-ahead manner delivers a PBI before or at least the same time of the last instruction of the BLI-stream;

predict paths of subsequent i-streams with the PBIs while fetching the remaining instructions of the BLI-stream;

dynamically reorder the PBIs to the last instruction of the BLI-stream fetched to the BL microprocessor;

decode the i-streams comprising the PBIs reordered; and execute the decoded i-streams comprising the decoded PBIs to produce compatible execution results of the BLI-streams in backend processing engines of the BL microprocessor.

18. The method of claim 17, wherein the BLC software system comprising:

a software program;
a software compiler for a target microprocessor; and
a BL compiler;

wherein the BLC software system is operable to:

classify instructions in a compiled software program according to branch operations of said instructions, wherein the classified instructions comprise (1) a PBI comprising a conditional branch instruction, wherein the conditional branch instruction requires to be predicted to determine its branch-taken or branch-not-taken operation, its branch-target location, and any useful information related to its branch operation, (2) a non-prediction-required branch instruction (NPBI) comprising an unconditional jump instruction, wherein the NPBI does not need to be predicted, and (3) a non-branch instruction (NBI) comprising an instruction that does not require any branch operations;

classify an i-stream in the compiled software program according to types of the i-streams comprising PBIs, NPBIs, and/or NBIs;

transform an i-stream to a BLI-stream by relocating the PBI at the last instruction of the i-stream to the first instruction of the i-stream and by shifting a single or plurality of the remaining instructions of the i-stream after the relocated PBI, wherein the BLI-stream is a transformed i-stream started with a PBI classify an i-stream to a non-branch look-ahead i-stream (NBLI-stream), wherein the NBLI-stream is an instruction sequence comprising at least an NPBI, but not comprising any PBI in the compiled software program;

classify an i-stream to a non-branch i-stream (NBI-stream), wherein the NBI-stream is an instruction sequence comprising a single or plurality of NBIs in the compiled software program;

comprise a PBI of a BLI-stream comprising an opcode to distinguish the PBI from other instructions, wherein the other instructions are NPBIs and NBIs, and information further comprising the last instruction of the BLI-stream, a branch target location, and a look-ahead branch prediction, wherein the look-ahead branch prediction is a PBI of the BLI-stream is fetched before fetching the remaining instructions of the BLI-stream;

assist prefetching and/or fetching of next i-streams comprising BLI-streams, non-BLI-streams, and/or NBI-streams according to the look-ahead branch prediction; and comprise a single or plurality of the i-streams comprising the BLI-streams, the NBLI-streams, and/or the NBI-streams representing a single or plurality of levels of loops in the compiled software program.

19. A-method of claim 17, wherein the BL hardware system comprising:

a branch look-ahead instruction memory (BLIM) system; and
a branch look-ahead memory management unit (BLMMU);
wherein the BL hardware system is operable to:
allocate instructions of i-streams comprising BLI-streams, NBLI-streams, and/or NBI-streams to an accessible main BLI memory in the BLIM system;
access a single or plurality of instructions of i-streams comprising BLI-streams, NBLI-streams, and/or NBI-streams from the accessible main BLI memory to accessible BLI caches in the BLIM system;
perform look-ahead instruction prefetches, wherein the look-ahead instruction prefetch is to identify a single or plurality of paths of a subsequent i-stream in advance and then prefetch instructions of a current i-stream by prefetching a branch instruction of the current i-stream before prefetching the instructions of the current i-stream;
perform look-ahead instruction fetches, wherein the look-ahead instruction fetch is to identify a path of a subsequent i-stream in advance and then fetch instructions of a current i-stream before fetching the instructions of the current i-stream;
perform look-ahead branch predictions, wherein the look-ahead branch prediction is to fetch a branch instruction of a current i-stream in advance and then predict a path of the current i-stream and then fetch instructions of the current i-stream;
overlap the look-ahead branch predictions and the look-ahead instruction prefetches and the look-ahead instruction fetches;
access a single or plurality of instructions of i-streams comprising BLI-streams, NBLI-streams, and/or NBI-streams from the accessible BLI caches to the BL microprocessor;
prefetch said instructions of the i-streams from the main BLI memory and/or an L2 BLI cache to an L1 BLI cache, wherein the L2 BLI cache is the level two BLI cache memory, wherein the L1 BLI cache is the level one BLI cache memory;
terminate a single or plurality of prefetches of the i-streams after prefetching the BLI-streams, the NBLI-streams, and/or the NBI-streams from both of a branch-target path and a fall-through path a single or plurality of times, wherein the fall-through path is next i-stream of current i-stream;
resume a single or plurality of prefetches of the BLI-streams, the NBLI-streams, and/or the NBI-streams when the L1 BLI cache is missed;
decode the prefetched PBIs of the BLI-streams and the prefetched NPBIs;
prefetch next BLI-streams, NBLI-streams, and/or NBI-streams via a PBI/NPBI decoder and stream program counters (PCs) in a branch look-ahead instruction prefetch (BLIP) system;
access a single or plurality of instructions of the BLI-streams, the NBLI-streams, and/or the NBI-streams via the L1 and L2 BLI caches, wherein accessing said instructions of the BLI-streams, the NBLI-streams, and/or the NBI-streams via the L1 and L2 BLI caches is further operable in a pipelined parallel manner;
perform look-ahead fetching of the BLI-streams, the NBLI-streams, and/or the NBI-streams addressed by a branch look-ahead instruction fetch (BLIF) system to the BL microprocessor upon a single or plurality of branch-target addresses is obtained from a single or plurality of the BL microprocessors;
decode the fetched PBIs of the BLI-streams and the prefetched NPBIs;
fetch next BLI-streams, NBLI-streams, and/or NBI-streams via the PBI/NPBI decoder and the stream PCs in the BLIF system;
perform next look-ahead prefetch and fetch operations of the BLI-streams, the NBLI-streams, and/or the NBI-streams according to the branch prediction results
fetch a plurality of PBIs from a plurality of the BLI-streams to a single or plurality of the BL microprocessors;
fetch a plurality of the PBIs to a single or plurality of branch predictors in the BL microprocessors;
predict a single or plurality of locations of next BLI-streams, NBLI-streams, and/or NBI-streams;
fetch a single or plurality of the remaining instructions of the BLI-streams to the BL microprocessors;
identify PBIs of BLI-streams representing a single or plurality of levels of loops (loop BLI-streams) by a PBI/NPBI decoder in the BLIF system;
reuse said PBIs of the BLI-streams representing said loops without fetching the PBIs from subsequent i-streams if the PBIs of the BLI-streams represent said loops and predict to continue said loops, and
otherwise, resume to fetch PBIs from subsequent i-streams;
perform the look-ahead branch prediction of the loops;
process any disrupting prefetch and/or fetch operations of i-streams comprising BLI-streams, NBLI-streams, and/or NBI-streams caused by branch predictors, interrupt processors, or any units in the BL microprocessors;
resume the prefetch and/or fetch operations of the i-streams comprising the BLI-streams, the NBLI-streams, and/or the NBI-streams by recovering the disrupted prefetch and/or fetch operations of the BLI-streams, the NBLI-streams, and/or the NBI-streams if the disrupting prefetch and/or fetch operations are completed; and
overlap the latencies related to the branch prediction wherein the latencies related to the branch prediction comprise taken-branch prediction latency, and the instruction fetch and execution time.

20. The method of claim 17, wherein the BL microprocessor comprising:
a stream fetch unit;
a branch predictor; a PBI decode unit; an end of BLI-stream identifier; an instruction reorder unit;
an instruction decoder;
an interrupt processor;
a stack memory; and
a single or plurality of backend processing engines;
wherein the BL microprocessor is operable to:
fetch i-streams comprising BLI-streams, NBLI-streams, and/or NBI-streams according to the addresses obtained from an inter-stream program counter (inter-SPC) in a stream fetch unit;
forward the i-streams comprising the BLI-streams, the NBLI-streams, and/or the NBI-streams to a PBI decode unit to identify the BLI-streams before (1) forwarding PBIs to branch predictors, (2) forwarding the remaining instructions of the BLI-streams to an end of a BLI-stream identifier, or (3) forwarding instructions of the NBLI-streams and NBI-streams to an instruction reorder unit;

perform look-ahead branch prediction operations of the PBIs received with the branch predictors;
produce a single or plurality of look-ahead branch prediction results of the PBIs of the BLI-streams from the branch predictors;
forward the look-ahead branch prediction results to the stream fetch unit;
update the inter-SPC and/or intra-stream program counters (intra-SPCs) in the stream fetch unit;
initiate fetch operations of the i-streams predicted by the branch predictors;
identify last instructions of the BLI-streams;
reorder the predicted PBIs after last instructions of the BLI-streams identified;
decode the reordered BLI-streams, the fetched NBLI-streams, and the fetched NBI-streams;
execute the PBIs with the backend processing engines;
verify the look-ahead branch prediction results with the backend processing engines;
perform interrupts and disrupted operations detected in the BL microprocessor;
identify the PBIs of BLI-streams representing a single of plurality of loop BLI-streams by the PBI decoder in the BL microprocessor;
reuse said PBIs of the BLI-streams representing said loops without fetching the PBIs from subsequent i-streams if the PBIs of the BLI-streams represent said loops and predict to continue said loops, and
otherwise, resume to fetch PBIs from subsequent i-streams, and
perform the look-ahead branch prediction of the loops;
process any disrupting prefetch and/or fetch operations of i-streams comprising BLI-streams, NBLI-streams, and/or NBI-streams caused by branch predictors, interrupt processors, or any units in the BL microprocessors;
store recovering information of disrupted operations to the stack memory;
process prefetch and/or fetch instructions of disrupting i-streams comprising BLI-streams, NBLI-streams, and/or NBI-streams
restore the recovered information of the disrupted operations from the stack memory;
decode a PBI relocated to the last of the BLI-stream reordered with the instruction decoder; and
transmit a single of plurality of addresses of i-streams comprising BLI-streams, NBLI-streams, and/or NBI-streams to the BL hardware system upon receiving the addresses of the i-streams comprising the BLI-streams, the NBLI-streams, and/or the NBI-streams from the branch predictors, the interrupt processors, or any units in the BL microprocessor.

* * * * *